(12) United States Patent
Tetsuka et al.

(10) Patent No.: US 7,438,658 B2
(45) Date of Patent: Oct. 21, 2008

(54) BICYCLE FRONT DERAILLEUR

(75) Inventors: Toshio Tetsuka, Sakai (JP); Etsuyoshi Watarai, Izumi (JP)

(73) Assignee: Shimano Inc., Osaka (JP)

( * ) Notice: Subject to any disclaimer, the term of this patent is extended or adjusted under 35 U.S.C. 154(b) by 741 days.

(21) Appl. No.: 10/928,741

(22) Filed: Aug. 30, 2004

(65) Prior Publication Data
US 2006/0058133 A1    Mar. 16, 2006

(51) Int. Cl.
*F16H 9/00* (2006.01)
*F16H 59/00* (2006.01)
*F16H 61/00* (2006.01)
*F16H 63/00* (2006.01)

(52) U.S. Cl. .............................. 474/82; 474/78; 474/80; 474/122; 474/127

(58) Field of Classification Search .................. 474/78, 474/80–83, 103, 119, 122, 126–128, 148; 280/260, 261
See application file for complete search history.

(56) References Cited

U.S. PATENT DOCUMENTS

| | | |
|---|---|---|
| 4,078,444 A | 3/1978 | Huret |
| 4,237,743 A | 12/1980 | Nagano |
| 4,479,787 A | 10/1984 | Bonnard |
| 4,516,961 A | 5/1985 | Coue |
| 4,961,720 A | 10/1990 | Juy |
| 5,624,336 A * | 4/1997 | Kojima ......................... 474/82 |
| 5,688,200 A * | 11/1997 | White .......................... 474/80 |
| 5,728,017 A * | 3/1998 | Bellio et al. .................. 474/70 |
| 7,059,983 B2 * | 6/2006 | Heim ........................... 474/80 |
| 2004/0130120 A1* | 7/2004 | Matsumoto et al. ......... 280/260 |
| 2005/0192137 A1* | 9/2005 | Ichida et al. .................. 474/70 |

FOREIGN PATENT DOCUMENTS

| | | |
|---|---|---|
| FR | 2 621 373 A | 4/1989 |
| GB | 2 036 895 A | 7/1980 |

* cited by examiner

*Primary Examiner*—Robert A. Siconolfi
*Assistant Examiner*—Thomas W Irvin
(74) *Attorney, Agent, or Firm*—Global IP Counselors, LLP

(57) ABSTRACT

A bicycle front derailleur includes a chain guide that is provided with a pushing element that is movable relative to the chain guide to assist in shifting a bicycle chain from a smaller front sprocket to an adjacent larger sprocket. The chain guide is part of a movable member that is movably coupled to a base member via a linkage assembly. The pushing element has a contact surface that preferably moves both laterally outwardly and longitudinally as the pushing element moves from a first position to a second position. Preferably, the pushing element is chain activated and arranged to move at least laterally outwardly by contacting a chain that is moving between inner and outer chain guide members of the movable member. Preferably, the pushing element is either a slidable member or a rotatable member.

27 Claims, 16 Drawing Sheets

FIG. 15
FIG. 16
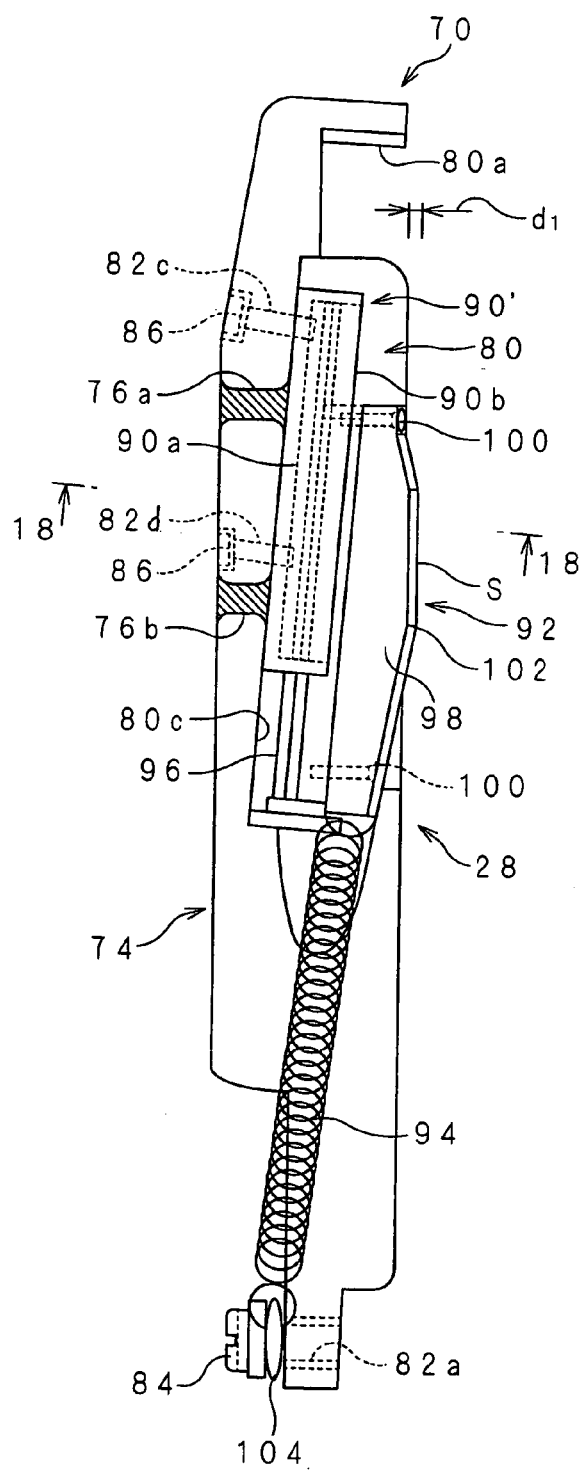
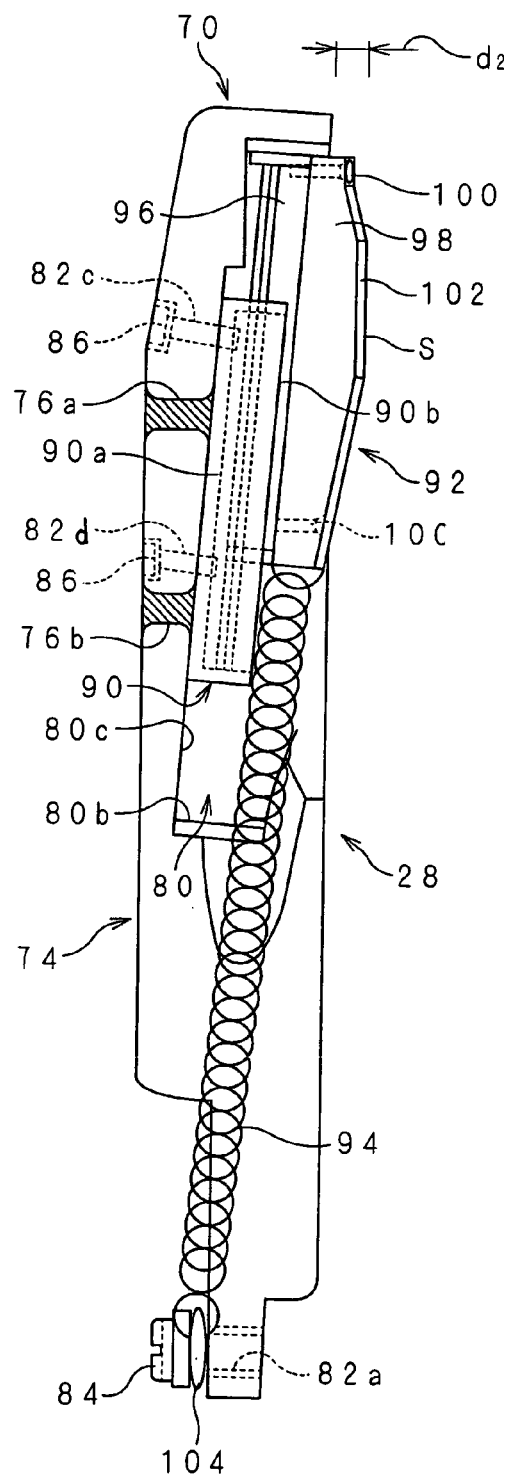

BICYCLE FRONT DERAILLEUR

BACKGROUND OF THE INVENTION

1. Field of the Invention

This invention generally relates to a bicycle front derailleur. More specifically, the present invention relates to a bicycle front derailleur that smoothly and reliably shifts a bicycle chain between the front sprockets of the drive train, and which aggressively shifts the bicycle chain to a larger front sprocket from a smaller front sprocket.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component or part of the bicycle that has been extensively redesigned over the years is the front derailleur. A front derailleur is typically mounted onto the bicycle frame adjacent to the front sprockets to shift the chain laterally between the front sprockets. Many bicycles have two or three front sprockets.

Generally, a front derailleur includes a fixed member non-movably secured to a bicycle frame, and a movable member supported to be movable relative to the fixed member. Typically, the fixed member is a tubular clamping member that is secured to the seat tube. Alternatively, the fixed member is sometimes coupled to the bottom bracket or coupled to a brazed-on mounting structure of the frame. In any case, the movable member typically has a chain guide with a pair of cage plates for contacting and moving a chain laterally between the front sprockets. The movable member is usually biased in a given direction relative to the fixed member by a spring. The movable member is usually moved relative to the fixed member by pulling and/or releasing a shift control cable that is coupled to the front derailleur. The movable member and the fixed member usually are interconnected through a plurality of pivotal links (i.e. a linkage assembly).

One problem with typical front derailleurs is that the chain is not always shifted from the smaller sprocket to the larger sprocket(s) as quickly (aggressively), smoothly and reliably as desired by some riders. Thus, undesirable audible clicking sounds can sometimes occur. Moreover, optimum power transfer from the rider to the bicycle might not be achieved during a front up shift (from smaller sprocket to larger sprocket) of the bicycle chain.

In view of the above, it will be apparent to those skilled in the art from this disclosure that there exists a need for an improved bicycle front derailleur that overcomes the above mentioned problems in the prior art. This invention addresses this need in the art as well as other needs, which will become apparent to those skilled in the art from this disclosure.

SUMMARY OF THE INVENTION

One object of the present invention is to provide a front bicycle derailleur that provides smooth, reliable shifting of the bicycle chain between the front sprockets of the drive train.

Another object of the present invention is to provide a front bicycle derailleur, which shifts the bicycle chain to a larger front sprocket from a smaller front sprocket more quickly (aggressively).

Another object of the present invention is to provide a bicycle front derailleur, which facilitates efficient power transfer from the rider to the bicycle during an up shift of the chain (from a smaller front sprocket to a larger front sprocket).

Yet another object of the present invention is to provide a bicycle front derailleur, which reduces audible noises during an up shift of the chain (from a smaller front sprocket to a larger front sprocket).

Yet still another object of the present invention is to provide front bicycle derailleur that is relatively simple and inexpensive to manufacture and/or assemble.

The foregoing objects can basically be attained by providing a bicycle front derailleur that comprises a base member, a movable member and a linkage assembly. The base member is configured to be fixedly coupled to a bicycle frame. The movable member has a chain guide portion. The linkage assembly is coupled between the base member and the movable member to move the chain guide portion between a retracted position and an extended position. The chain guide portion includes a chain guide member and a pushing element with a contact surface. The pushing element is arranged to move relative to the chain guide member from a first position to a second position such that the contact surface moves both laterally outwardly and longitudinally as the pushing element moves from the first position to the second position.

The foregoing objects can also basically be attained by providing a bicycle front derailleur that comprises a base member, a movable member and a linkage assembly. The base member is configured to be fixedly coupled to a bicycle frame. The movable member has a chain guide portion. The linkage assembly is coupled between the base member and the movable member to move the chain guide portion between a retracted position and an extended position. The chain guide portion includes an outer chain guide member, an inner chain guide member coupled to the outer chain guide member and a chain activated pushing element arranged to move relative to the inner chain guide member from a first position to a second position that is located laterally closer to the outer chain guide member by contacting a chain that is moving between the inner and outer chain guide members.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 15 is a further enlarged, top plan view of the inner guide member of the front derailleur illustrated in FIGS. 3 and 7-10, with portions broken away for the purpose of illustration of the pushing mechanism (with the pushing element of the pushing mechanism located in an initial rest or first position);

FIG. 16 is a further enlarged, top plan view of the inner guide member of the front derailleur illustrated in FIGS. 3 and 7-10, with portions broken away for the purpose of illustration of the pushing mechanism (with the pushing element of the pushing mechanism located in a final moved or second position);

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
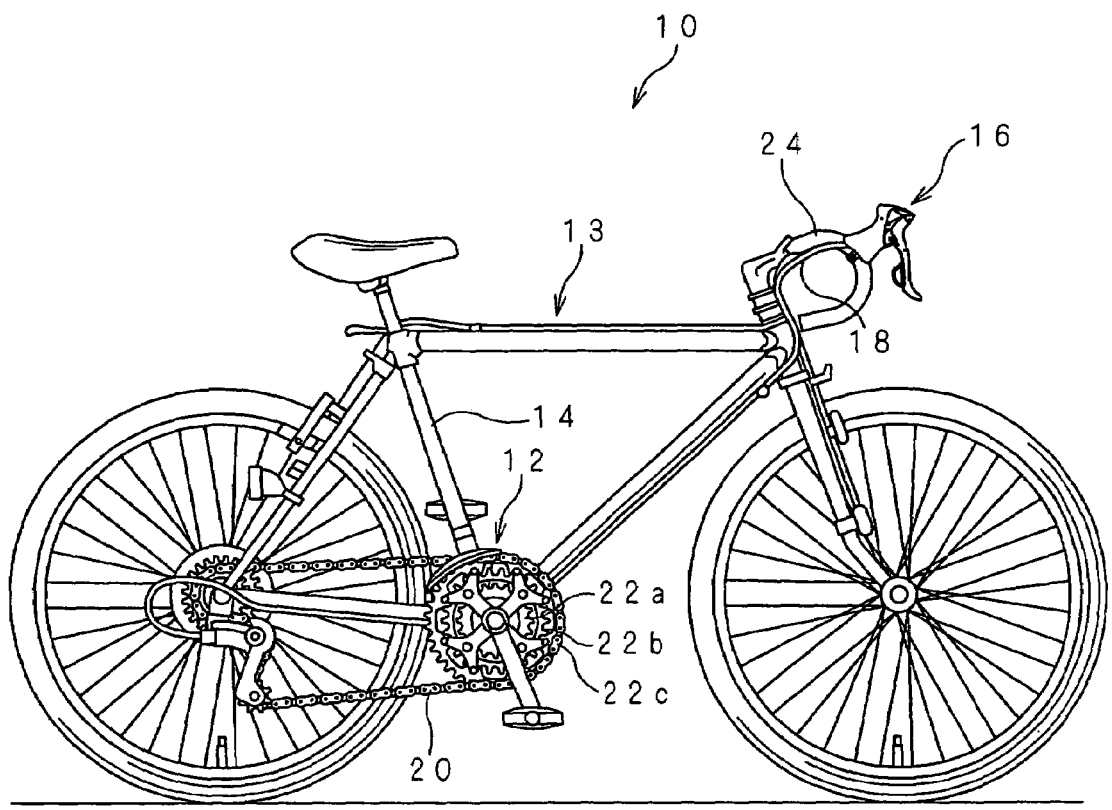
FIG. 1 is a side elevational view of a bicycle equipped with a front derailleur in accordance with a first preferred embodiment of the present invention.
Figure 2:
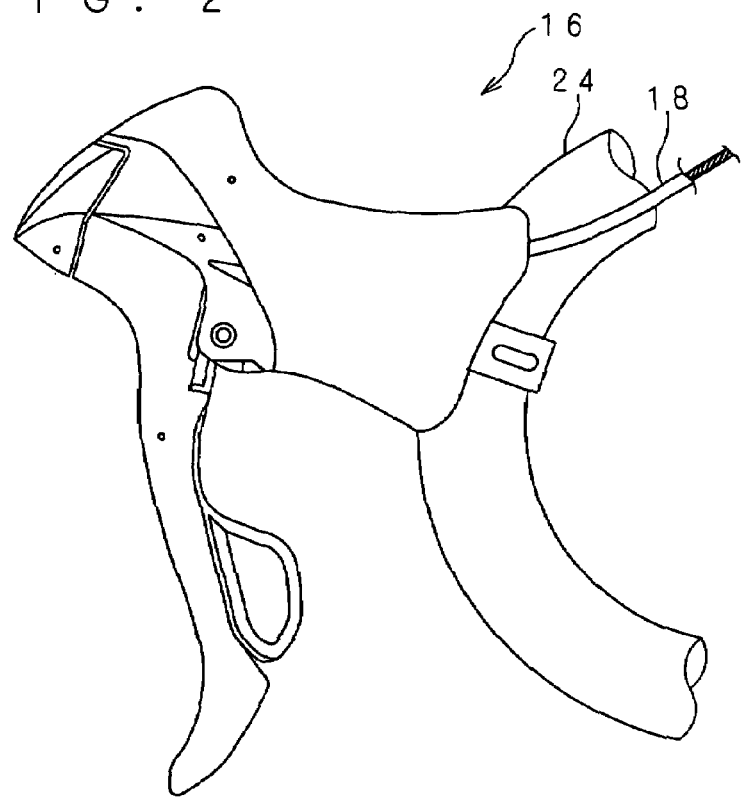
FIG. 2 is an opposite side elevational view of the view of a front shifter or shift operating device that operates the front derailleur illustrated in FIG. 1.
Figure 3:
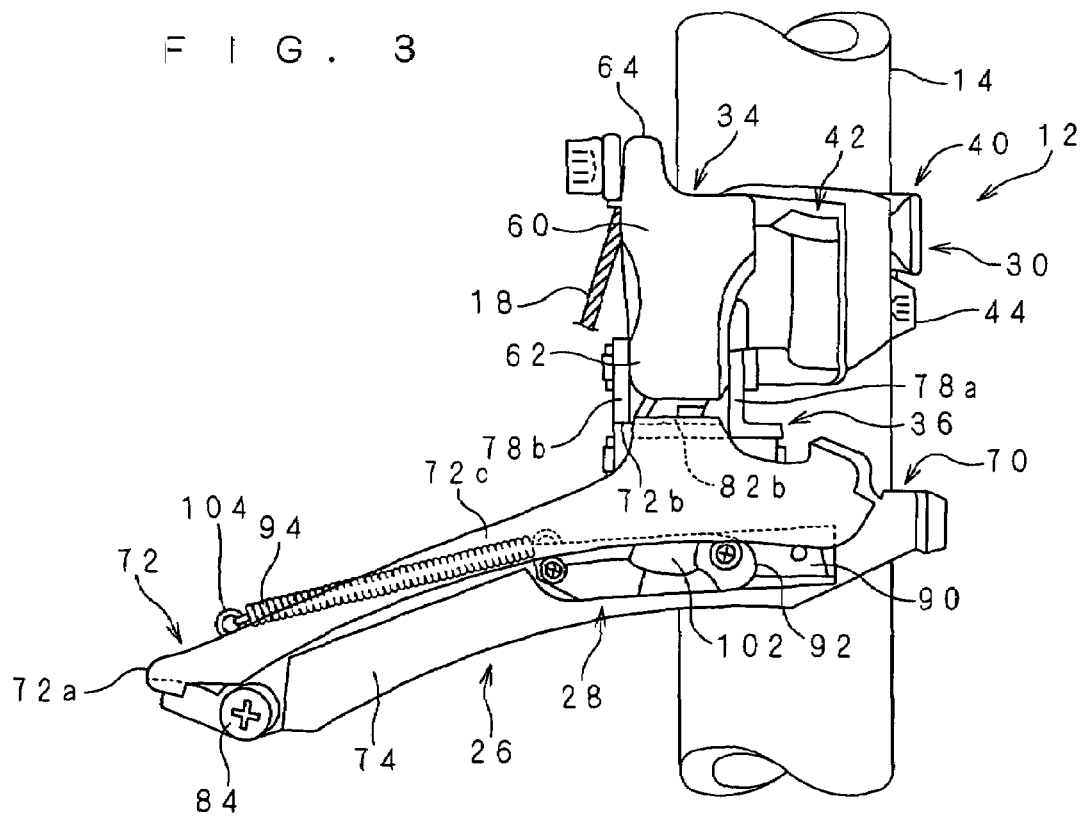
FIG. 3 is an enlarged outside elevational view of the front derailleur of the bicycle illustrated in FIG. 1, with the front derailleur coupled to the seat tube.

Referring initially to FIGS. 1-3, a bicycle 10 with a front derailleur 12 is illustrated in accordance with a first embodiment of the present invention. The front derailleur 12 is relatively conventional, except the front derailleur 12 includes a chain guide portion 26 with a chain pushing mechanism 28 in accordance with the present invention. Specifically, the pushing mechanism 28 is arranged and configured to move relative to the chain guide portion 26 in order to assist in up shifting in accordance with the present invention. The pushing mechanism 28 is preferably a chain activated mechanism that moves relative to the chain guide portion 26, independently of movement of other parts of the front derailleur 12. The pushing mechanism 28 is preferably movably attached to the chain guide portion 26 without being attached to other parts of the front derailleur 12. The pushing mechanism 28 and the chain guide portion 26 will be explained below in more detail.

The front derailleur 12 is fixedly coupled to a seat tube 14 of a bicycle frame 13. The front derailleur 12 is operated in a relatively conventional manner by a shifting unit 16 via a shift control cable 18 to move a chain 20 by the chain guide portion 26 between three front sprockets 22a, 22b and 22c of the drive train. The shifting unit 16 is mounted on the handlebar 24 as seen in FIG. 2. The shifting unit 16 is conventional. While the front derailleur 12 is illustrated as a three-stage or three position derailleur that shifts the chain 20 between the three front sprockets 22a, 22b and 22c of the drive train, it will be apparent to those skilled in the art from this disclosure that the front derailleur 12 can be used in a drive train with only two front sprockets as needed and/or desired.

Bicycles and their various components are well known in the art, and thus, bicycle 10 and its various components will not be discussed and/or illustrated in detail herein, except for the components that relate to the present invention. In other words, only the front derailleur 12 and the components that relate thereto will be discussed and/or illustrated in detail herein. As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

Figure 4:
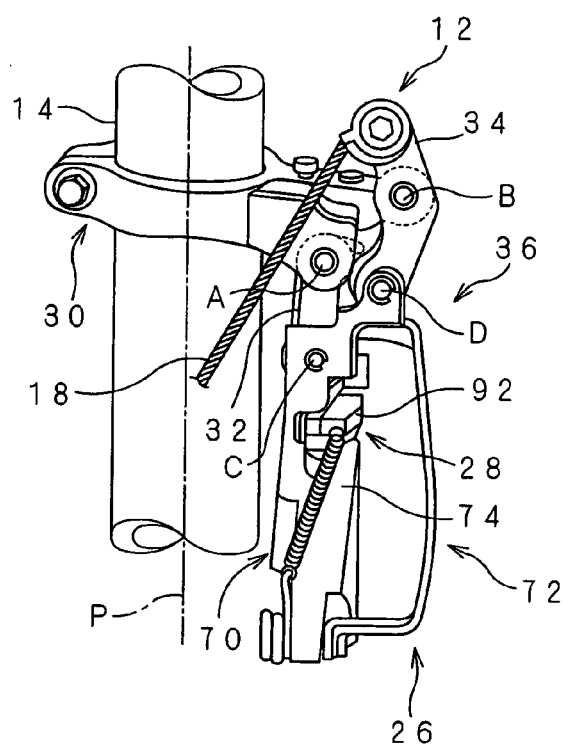
FIG. 4 is a rear perspective view of the front derailleur of the bicycle illustrated in FIGS. 1 and 3 with the chain guide in an inner most shift position.
Figure 5:
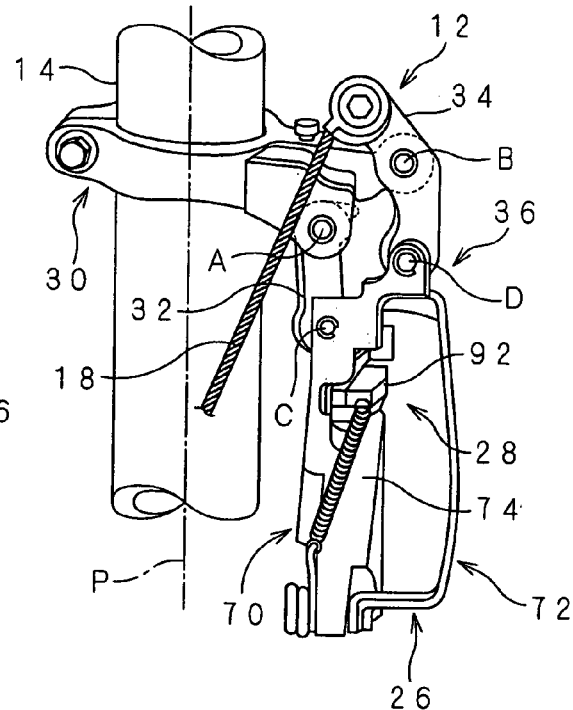
FIG. 5 is a rear perspective view of the front derailleur of the bicycle illustrated in FIGS. 1 and 3 with the chain guide in the middle/intermediate shift position.
Figure 6:
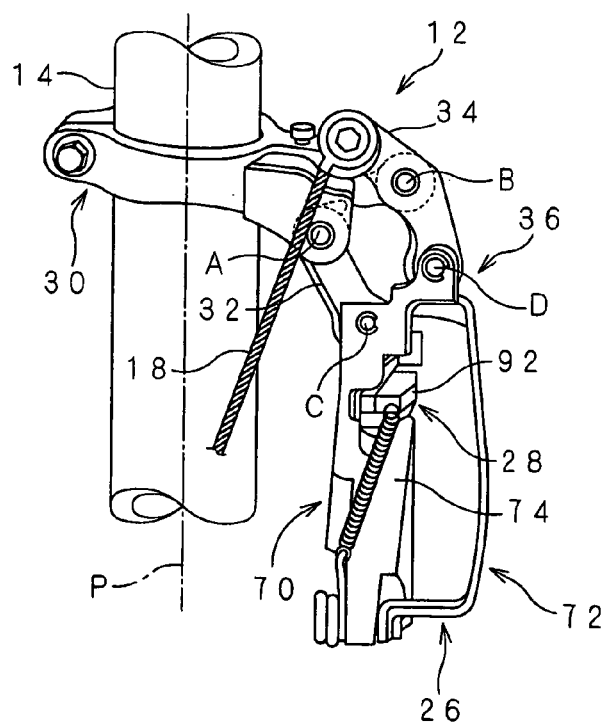
FIG. 6 is a rear perspective view of the front derailleur of the bicycle illustrated in FIGS. 1 and 3 with the chain guide in the outer most shift position.

Referring now to FIGS. 3-10, the front derailleur 12 of the present invention will now be discussed in more detail. The front derailleur 12 basically includes a base member 30, an inner link member 32, an outer link member 34, a movable member 36 and a biasing member 38. The movable member 36 has the chain guide portion 26 with the pushing mechanism 28 movably coupled thereto in accordance with the present invention. The base member 30 is fixedly coupled to the seat tube 14 of the bicycle frame 13. The inner and outer link members 32 and 34 are pivotally coupled to both the base member 30 and the movable member 36 to form a four bar linkage such that the chain guide portion 26 is movable between a retracted position and an extended position, as best seen in FIGS. 4-6. More specifically, the chain guide portion 26 is movable between an innermost retracted position, an intermediate retracted/extended position and an outermost extended position as best seen in FIGS. 4-6, respectively.

Specifically, the inner and outer link members 32 and 34 are pivotally coupled to the base member 30 at their upper ends to pivot relative to the base member 30 about upper (inner and outer) pivot axes A and B, respectively. The inner and outer link members 32 and 34 are also pivotally coupled to the movable member 36 at their lower ends to pivot relative to the movable member 36 about lower (inner and outer) pivot axes C and D, respectively. The biasing member 38 is preferably disposed on the pivot axis C, and is preferably located on a front side of the inner link member 32. More specifically, the biasing member 38 is operatively coupled between the inner link member 32 and the movable member 36 to apply an urging force that normally biases the movable member 36 toward the seat tube 14 of the bicycle frame 13 (i.e. toward a center plane P of the bicycle 10).

In the illustrated embodiment, the front derailleur 12 is a bottom swing type front derailleur. Thus, the movable member 36 moves laterally outward and upwardly relative to the center longitudinal plane P of the bicycle frame 13 when the control cable 18 is pulled by the shifting unit 16. Accordingly, the movable member 36 moves laterally towards/away from the seat tube 14 of the bicycle frame 13 to shift the chain 20 laterally between the front sprockets 22a, 22b and 22c by operating the shifting unit 16, which releases/pulls the shift control cable 18. In other words, the inner and outer links 32 and 34 swing below the pivot axes A and B to form a four bar linkage assembly together with the base member 30 and the movable member 36 of the front derailleur 12 in a relatively conventional manner.

The base member 30 basically includes a frame fixing portion 40 and a derailleur support portion 42 fixedly attached to the frame fixing portion 40. The frame fixing portion 40 and the derailleur support portion are fixed coupled together by main fixing bolt 44. Specifically, a curved surface of the derailleur support portion 42 is received in a mating recess of the frame fixing portion 40 to prevent relative rotation of the derailleur support portion 42 relative to the frame fixing portion 40. Then, the main fixing bolt 44 is inserted through a hole (not shown) of the frame fixing portion 40 into a threaded blind bore (not shown) of the derailleur support portion 42 in a conventional manner. The derailleur support portion 42 pivotally supports the inner and outer link members 32 and 34. Preferably, the parts of the base member 30 are constructed of lightweight rigid materials such as metallic materials. However, some of the parts can be constructed of other materials such as hard, rigid non-metallic materials (e.g., such as a hard plastic material).

The frame fixing portion 40 basically includes a first C-shaped tubular clamping member 40a, a second C-shaped tubular clamping member 40b, a pivot pin 40c and a threaded fastener 40d. Thus, the frame fixing portion 40 is preferably a tubular clamping portion of the base member 30. The pivot pin 40c pivotally couples a pair of adjacent ends of the tubular clamping members 40a and 40b together in a conventional manner. The fastener 40d releaseably couples the free ends of the tubular clamping members 40a and 40b together in a conventional manner. For example, the fastener 40d is preferably a screw or bolt that extends through a hole in the free end of the second clamping member 40b and that is threaded into a nut, or the like in a conventional manner. Alternatively, the fastener 40d can be directly threaded into a threaded hole of the first clamping member 40a. A center frame mounting axis X is formed by the curved inner mounting surfaces of the first and second clamping members 40a and 40b, which substantially corresponds to the center axis of the seat tube 14 and lies in the center plane P when coupled to the frame 13.

The first tubular clamping member 40a preferably has the derailleur support portion 42 fixedly attached thereto. Thus, the base member 30 is basically constructed of three pieces (i.e., the clamping members 40a and 40b, and the derailleur support portion 42) that are all preferably constructed of a lightweight, rigid material. Preferably, these parts are constructed of metal utilizing conventional manufacturing techniques such as casting and/or machining. However, it will be apparent to those skilled in the art from this disclosure that the clamping members 40a and 40b could be constructed of other materials and/or could be constructed using other manufacturing techniques as needed and/or desired. Moreover, it will be apparent to those skilled in the art from this disclosure that the derailleur support portion 42 could be integrally formed with the first clamping member 40a as needed and/or desired.

The derailleur support portion 42 of the base member 30 has the inner and outer link members 32 and 34 pivotally coupled thereto, as mentioned above. Specifically, the derailleur support portion 42 includes a pair of inner mounting flanges or attachment elements 46a and 46b and an outer mounting flange or attachment element 48. The inner link member 32 is pivotally coupled between the attachment elements 46a and 46b, while the outer link member 34 is pivotally coupled to the outer attachment element 48.

A pair of threaded adjustment holes (not shown) have vertical adjustment screws threadedly coupled therein to control the movement of the inner link member 32, and thus, the movable member 36. The adjustment screws can be rotated to adjust their vertical positions such that their free ends selectively contact the inner link member 32 to control the range of movement of the inner link member 32, and thus, control the range of movement of the movable member 36, in a relatively conventional manner.

The attachment elements 46a and 46b of the derailleur support portion 42 extend downwardly and are substantially parallel to each other. The attachment element 46b is spaced longitudinally rearwardly from the attachment element 46a. Accordingly, a recess is formed between the attachment elements 46a and 46b for pivotally receiving the inner link member 32 therebetween. The outer (upper) attachment element 48 of the derailleur support portion 42 pivotally supports the outer link member 34. Pivot pins or the like are used to couple the inner and outer link members 32 and 34 to the inner attachment elements 46a and 46b and to the outer attachment element 48 in a conventional manner.

Referring still to FIGS. 3-10, the inner link member 32 basically includes an upper coupling portion 50, a lower coupling portion 52 and a transitional portion 54 arranged between the upper and lower coupling portions 50 and 52. The inner link member 32 is preferably constructed of a lightweight, rigid material. Specifically, the inner link member 32 is preferably constructed of metal as a one-piece, unitary member utilizing conventional manufacturing techniques such as casting and/or machining. However, it will be apparent to those skilled in the art from this disclosure that the inner link member 32 could be constructed of other materials and/or could be constructed using other manufacturing techniques as needed and/or desired.

The upper coupling portion 50 of the inner link member 32 is pivotally coupled to the base member 30 between the inner attachment elements 46a and 46b, while the lower coupling portion 52 of the inner link member 32 is pivotally coupled to the movable member 36. The upper coupling portion 50 is preferably wider (thicker) than the lower coupling portion 52, as measured in the longitudinal direction of the bicycle 10. Moreover, the lower coupling portion 52 is preferably offset in the rearward direction of the bicycle 10 from the upper coupling portion 50. The transitional portion 54 has a varying thickness that decreases as the transitional portion 54 approaches the lower coupling portion 52 from the upper coupling portion 50.

The upper coupling portion 50 preferably includes a pair of projections (not shown in detail) designed to selectively contact the lower ends of the adjustment screws mounted to the derailleur support portion 42, in a conventional manner. The lower coupling portion 52 preferably includes an abutment projection 56 that is configured to optionally engage one end of a biasing member. However, in the illustrated embodiment, the end of the biasing member 38 extends upwardly to engage the transition portion 54 rather than the projection 56. In other words, depending on the type of biasing member desired, the projection 56 may or may not be utilized.

Referring still to FIGS. 3-10, the outer link member 34 basically includes an upper coupling portion 60, a lower coupling portion 62 and a cable attachment portion 64 extending from the upper coupling portion 60. The outer link member 34 is preferably constructed of a lightweight, rigid material. Specifically, the outer link member 34 is preferably constructed of metal as a one-piece, unitary member utilizing conventional manufacturing techniques such as casting and/or machining. However, it will be apparent to those skilled in the art from this disclosure that the outer link member 34 could be constructed of other materials and/or could be constructed using other manufacturing techniques as needed and/or desired.

The upper coupling portion 60 of the outer link member 34 is pivotally coupled to the outer (upper) attachment element 48 of the base member 30, while the lower coupling portion 62 of the outer link member 34 is pivotally coupled to the movable member 36. The upper coupling portion 60 is preferably wider (thicker) than the lower coupling portion 62, as measured in the longitudinal direction of the bicycle 10. The cable attachment portion 64 of the outer link member 34 extends upwardly from the upper coupling portion 60, and is configured to have the control cable 18 fixedly coupled thereto via a cable attachment device in a conventional manner. Thus, when the control cable 18 is pulled/released, the outer link member 34 will rotate about the pivot axis B to move the movable member 36 laterally relative to the base member 30.

The upper coupling portion 60 of the outer link member 34 includes a pair of longitudinally spaced parallel (front and rear) mounting flanges or attachment elements 66a and 66b that are configured to receive the outer attachment element 48 of the base member 30 longitudinally therebetween. The lower coupling portion 62 of the outer link member 34 is pivotally coupled to the movable member 36. The cable attachment portion 64 is narrower (thinner) than both the upper coupling portion 60 and the lower coupling portion 62 in the longitudinal direction of the bicycle 10. The cable attachment portion 64 extends from the rearward side of the upper coupling portion 60. The cable attachment portion 64 basically includes a threaded through bore 68 configured to have the cable fixing device mounted thereto in a conventional manner, as mentioned above.

Referring now to FIGS. 3-18, the movable member 36 in accordance with the present invention will now be discussed in more detail. The movable member 36 basically includes an inner chain guide member 70, an outer chain guide member 72 and the pushing mechanism 28. Preferably, the inner and outer chain guide members 70 and 72 are each constructed of a lightweight rigid material such as a metallic material in a conventional manner (e.g., by machining, casting and/or by bending a rigid sheet material) to form the desired shape. The inner and outer guide members 70 and 72 are fixedly, non-movably coupled together to form a chain receiving slot therebetween, while the pushing mechanism 28 is preferably movable attached to the inner chain guide member 70.

In this embodiment, the pushing mechanism 28 is slidably attached to the inner guide member 70 of the movable member 36 to move relative thereto. Specifically, the pushing mechanism 28 is preferably slidably coupled to the inner guide member 70 via a protrusion and recess arrangement, as explained below in more detail. However, it will be apparent to those skilled in the art from this disclosure that the pushing mechanism 28 could be coupled to other parts of the movable member 36 (i.e., instead of or in addition to the inner guide member 70) if needed and/or desired. Moreover, it will be apparent to those skilled in the art from this disclosure that the movable member 36 could include a modified pushing mechanism that moves in a different manner than the pushing mechanism 28. For example, the movable member 36 could include a rotatable, cam-shaped pushing element instead of slidable pushing mechanism 28, as discussed below with reference to another preferred embodiment of the present invention.

Referring mainly to FIGS. 11-20, the inner guide member 70 basically includes an inner chain guide plate element 74, a pair of inner mounting flanges 76a and 76b, a pair of outer mounting flanges 78a and 78b and a mounting recess 80. The inner and outer mounting flanges 76a, 76b, 78a and 78b extend upwardly from the inner guide plate element 74 to form a mounting portion of the movable member 36. The chain guide plate element 74 has the mounting recess 80 formed therein for movably receiving the pushing mechanism 28 therein, as explained in more detail below.

The inner mounting flanges 76a and 76b have the lower coupling portion 52 of the inner link member 32 pivotally coupled therebetween for rotation about the pivot axis C, while the outer mounting flanges 78a and 78b have the lower coupling portion 62 of the outer link member 34 pivotally coupled therebetween for rotation about the pivot axis D. Pivot pins or the like are used to couple the inner and outer link members 32 and 34 to the mounting flanges 76a and 76b, and to the mounting flanges 78a and 78b, respectively, in a conventional manner. The inner guide member 70 is preferably constructed by casting and/or machining a single piece of metallic material.

The inner chain guide plate element 74 further includes a rear attachment opening 82a, a front attachment opening 82b and a pair of side attachment openings 82c and 82d. The rear attachment opening 82a is preferably a threaded opening configured to receive a pair of first fasteners 84 from opposite lateral sides thereof. Specifically, one of the fasteners 84 is preferably used to fixedly attach the outer guide member 72 to the inner guide member 70, while the other fastener 84 is used to attach part of the pushing mechanism 28 to the inner guide member 70, as explained below. In the illustrated embodiment, the fasteners 84 are screws and the rear attachment opening 82a has a pair of oppositely threaded sections configured to threaded receive the fasteners 84 therein. The front attachment opening 82b is preferably a vertical opening that receives a rivet or the like in order to fixedly couple the outer guide member 72 to the inner guide member 70. The side attachment openings 82c and 82d are used to couple another part of the pushing mechanism 28 to the inner guide member 70, as also explained below.

The mounting recess 80 includes front and rear stops 80a and 80b as well as a mounting surface 80c to control movement of the pushing mechanism 28. Preferably, the front and rear stops 80a and 80b are coated with resilient material such as rubber. The mounting surface 80c extends in a substantially longitudinal direction in an area between the front and rear stops 80a and 80b. More specifically, the mounting surface 80c is preferably a substantially vertical surface that forms an angle θ relative to the center plane P of between about 5° and about 10°. Preferably, the angle θ is about 5°. The pushing mechanism 28 is preferably attached to the mounting surface 80c using the side attachment openings 82c and 82d. In particular, the side attachment openings 82c and 82d extend between the mounting surface 80c and the laterally inside surface of the inner chain guide plate element 74 such that a pair of secondary fasteners or screws 86 can be inserted therein and threadedly coupled to part of the pushing mechanism 28.

In the illustrated embodiment, the pushing mechanism 28 basically includes a fixed track 90, a movable chain pushing element 92 and a biasing element 94. The track 90 is fixed attached to the inner guide element 74 within the mounting recess 80 with the pair of fasteners or screws 86. The pushing element 92 is freely slidably mounted to the track 90 to move between the front and rear stops 80a and 80b. In particular, part of the pushing element 92 is received in the track 90 to form a protrusion and recess arrangement together with the track 90. The biasing element 94 is preferably coupled between the pushing element 92 and one of the fasteners 84 at the rear of the movable member 36 to urge the pushing element 92 substantially in the rearward direction.

More specifically, the pushing element 92 slides relative to the track 90, and thus, relative to the inner chain guide plate element 74. Due to the inclination of the mounting surface 80c, the pushing element 92 preferably slides in a substantially longitudinal direction (i.e., at an angle of about 5° relative to the center plane P). More specifically, the pushing element slides from an initial (first) position where its outer most edge is spaced a distance $d_1$ of about 1.0 millimeter from the side surface of the inner chain guide plate element 74 as seen in FIG. 15 to a final moved (second) position in which its outer most edge is spaced a distance $d_2$ of about 4.0 millimeters from the side surface of the inner chain guide plate element 74 as seen in FIG. 16. Thus, due to the inclination of the of the mounting surface 80c, the pushing element 92 moves both longitudinally forward and laterally outward as it moves from the first position to the second position as seen in FIGS. 15 and 16.

The pushing element 92 is chain activated. In other words, the pushing element 92 normally moves with the movable member 36 and does not move relative to the movable member 36, unless the chain 20 contacts the pushing element 92 during an up shift. When the moving chain 20 contacts the pushing element 92 during an up shift, the pushing element 92 then moves relative to the movable member 36 to push the chain laterally outwardly as the pushing element 92 slides forward.

Figure 18:
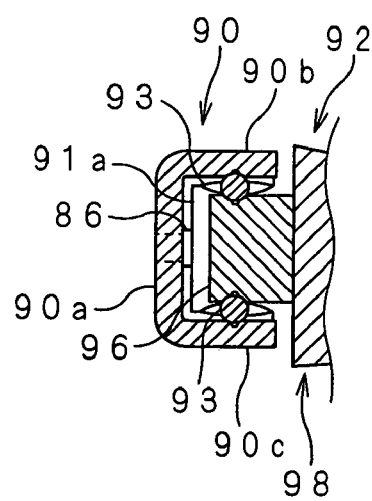
FIG. 18 is an enlarged, partial cross-sectional view of the pushing mechanism illustrated in FIGS. 15 and 16, as seen along section line 18-18 of FIG. 15.
Figure 19:
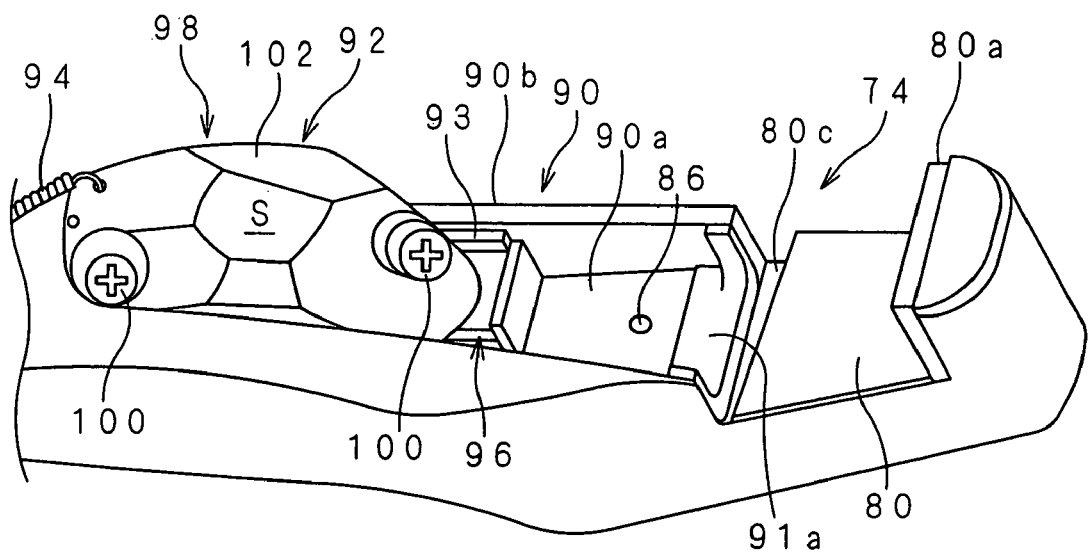
FIG. 19 is an enlarged, partial front side perspective view of the pushing mechanism of the front derailleur illustrated in FIGS. 3-14.
Figure 20:
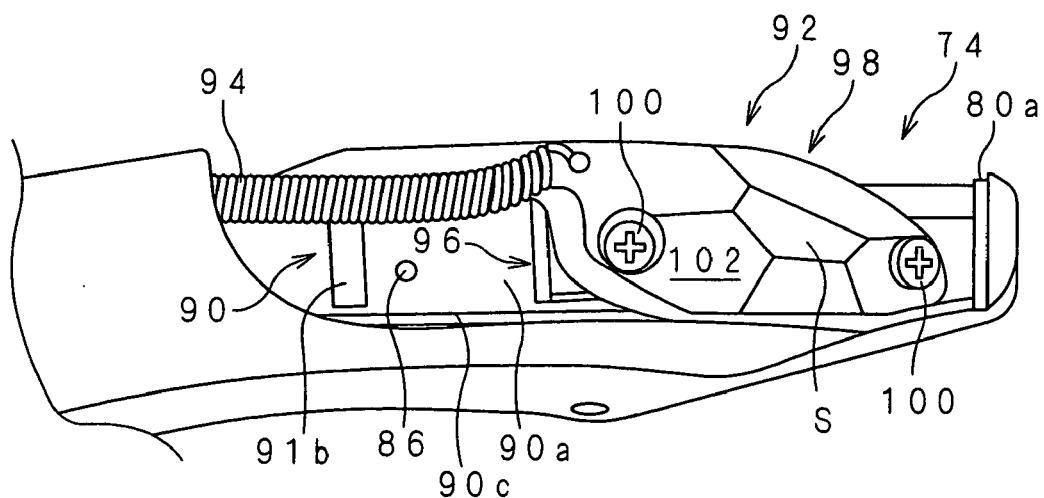
FIG. 20 is an enlarged, partial rear side perspective view of the pushing mechanism of the front derailleur illustrated in FIGS. 3-14.
Figure 21:
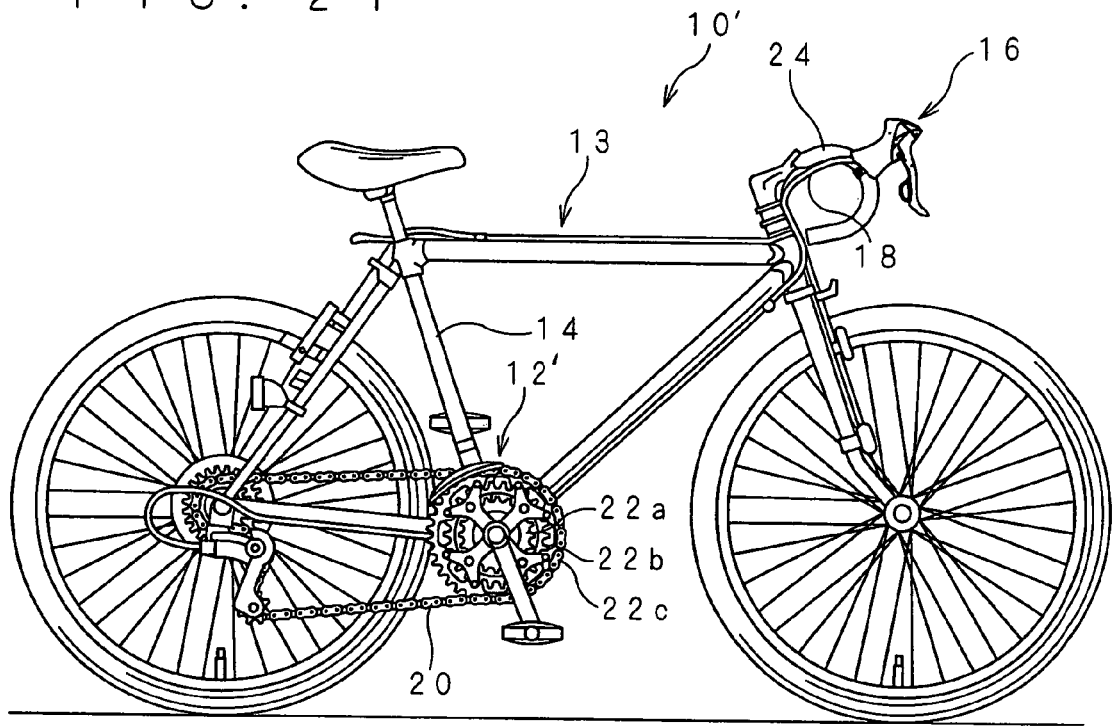
FIG. 21 is a side elevational view of a bicycle equipped with a front derailleur in accordance with a second preferred embodiment of the present invention.
Figure 22:
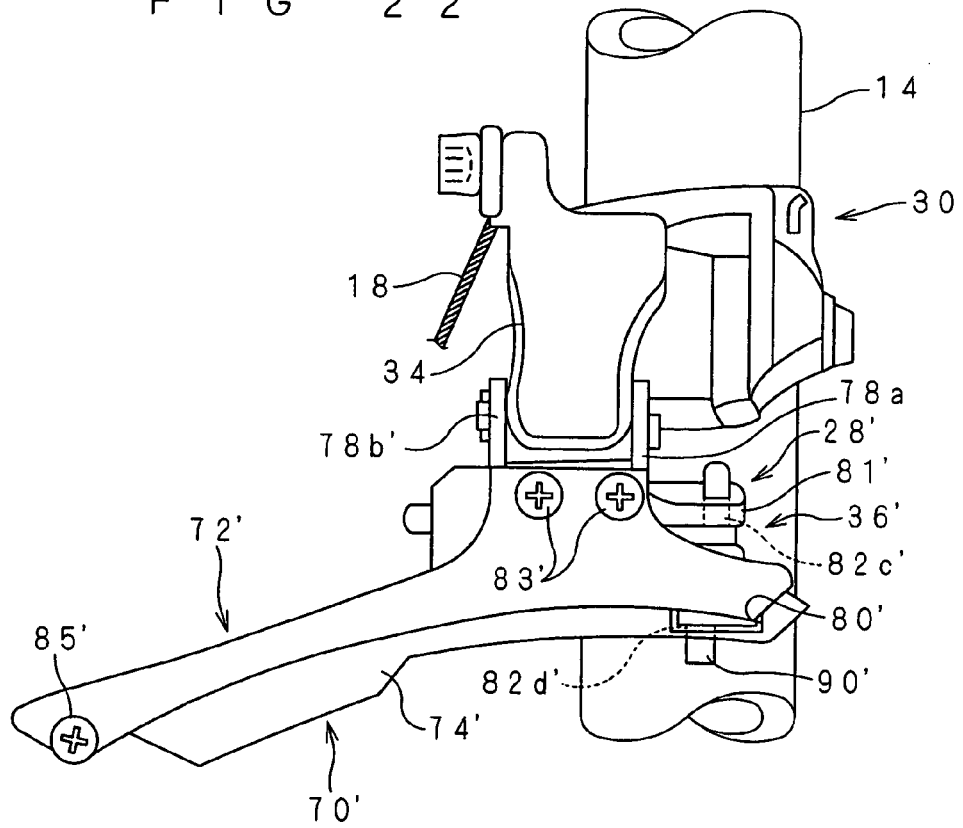
FIG. 22 is an enlarged outside elevational view of the front derailleur of the bicycle illustrated in FIG. 21 in accordance with the second preferred embodiment of the present invention, with the front derailleur coupled to the seat tube.
Figure 23:
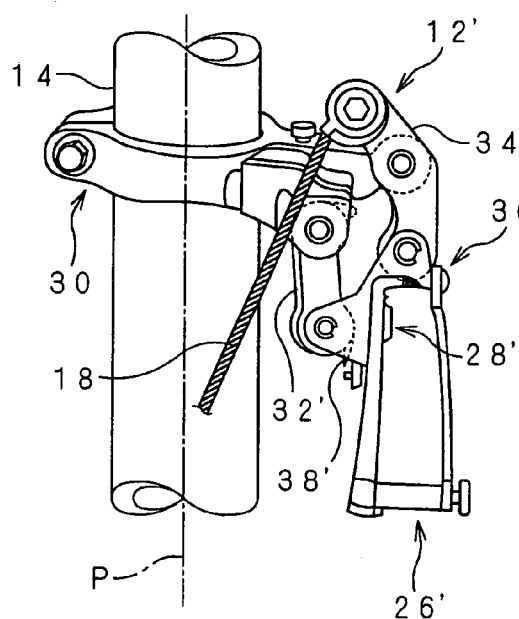
FIG. 23 is a rear perspective view of the front derailleur illustrated in FIG. 22 with the chain guide in an inner most shift position.
Figure 24:
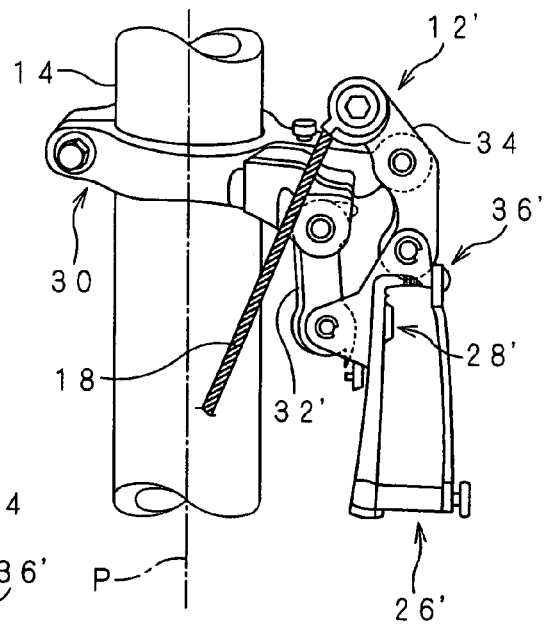
FIG. 24 is a rear perspective view of the front derailleur illustrated in FIG. 22 with the chain guide in the middle/intermediate shift position.
Figure 25:
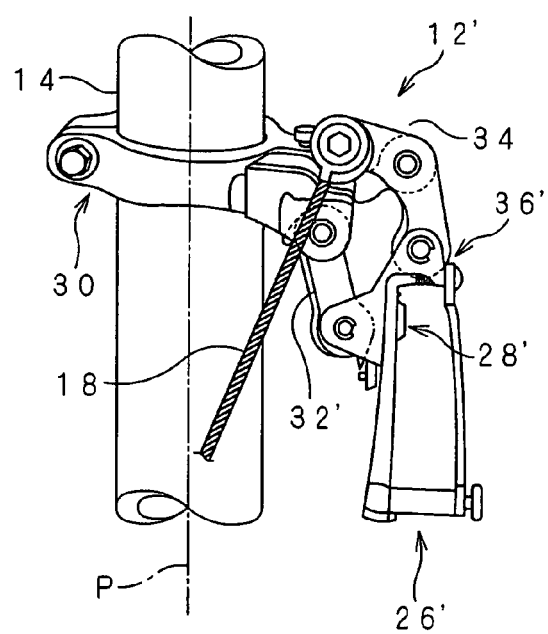
FIG. 25 is a rear perspective view of the front derailleur illustrated in FIG. 22 with the chain guide in the outer most shift position.
Figure 26:
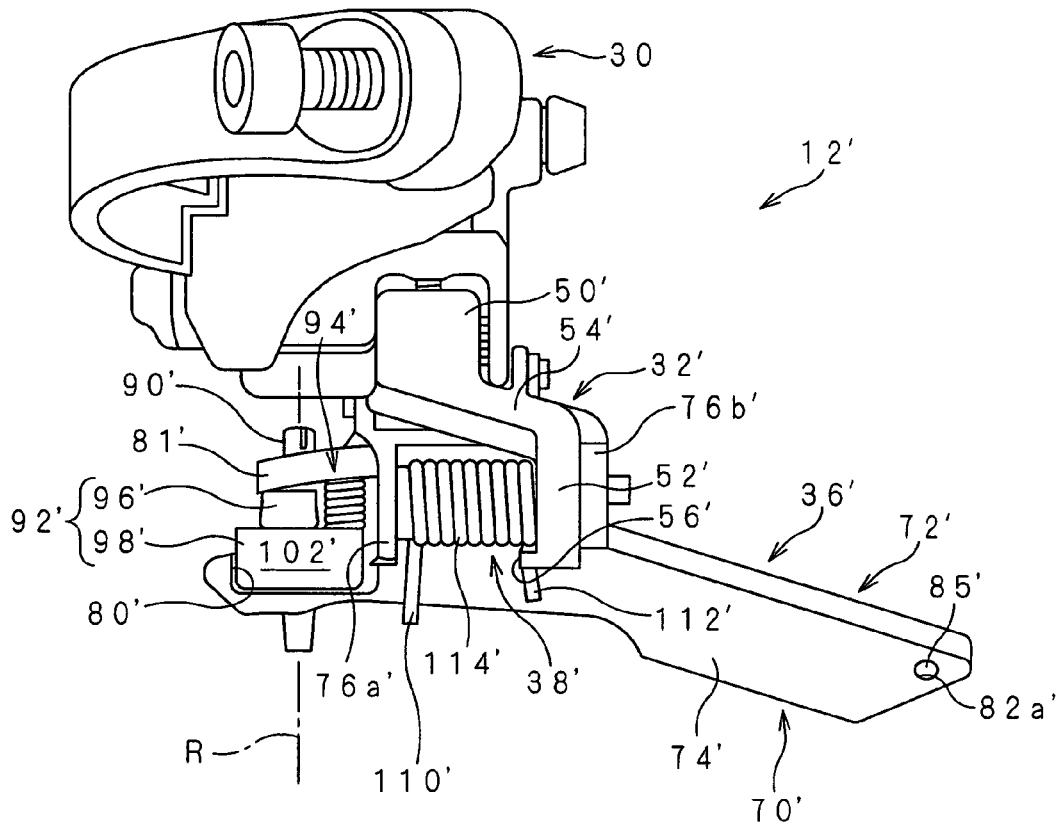
FIG. 26 is an inside elevational view of the front derailleur illustrated in FIG. 22, with the seat tube removed for the purpose of illustration.
Figure 27:
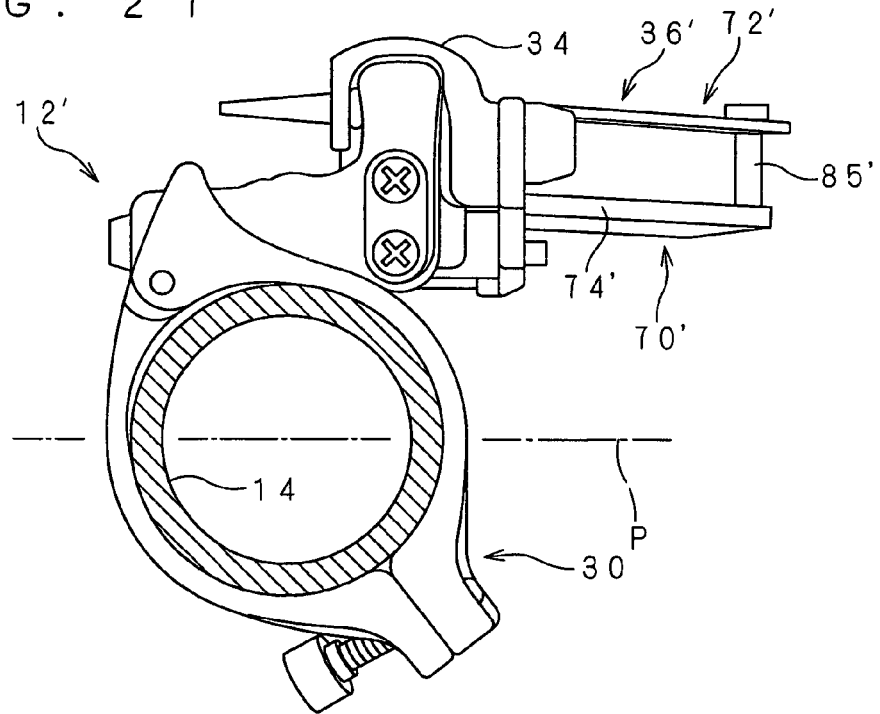
FIG. 27 is a top, plan view of the front derailleur illustrated in FIGS. 22 and 26, with the front derailleur coupled to the seat tube.
Figure 28:
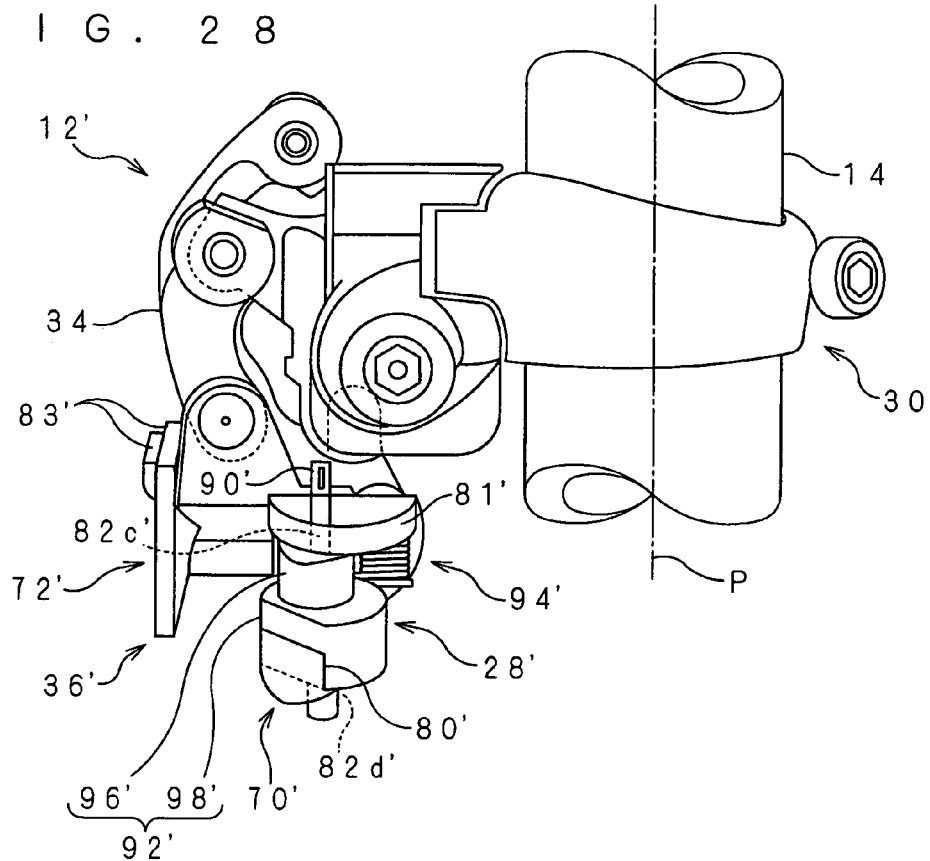
FIG. 28 is a front elevational view of the front derailleur illustrated in FIGS. 22, 26 and 27, with the front derailleur coupled to the seat tube.
Figure 29:
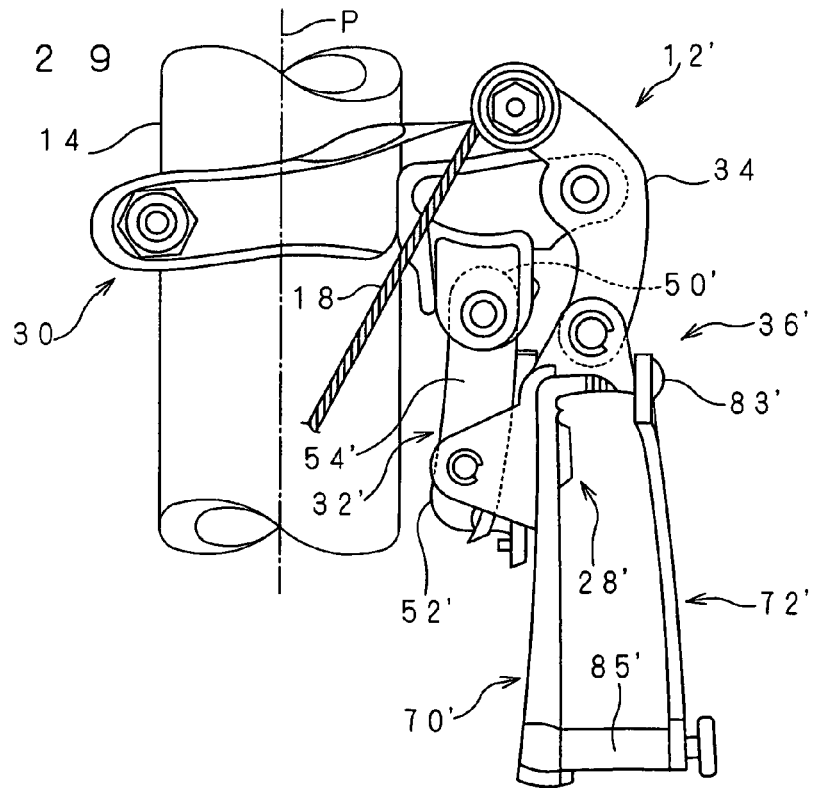
FIG. 29 is a rear elevational view of the front derailleur illustrated in FIGS. 22 and 26-28, with the front derailleur coupled to the seat tube.
Figure 30:
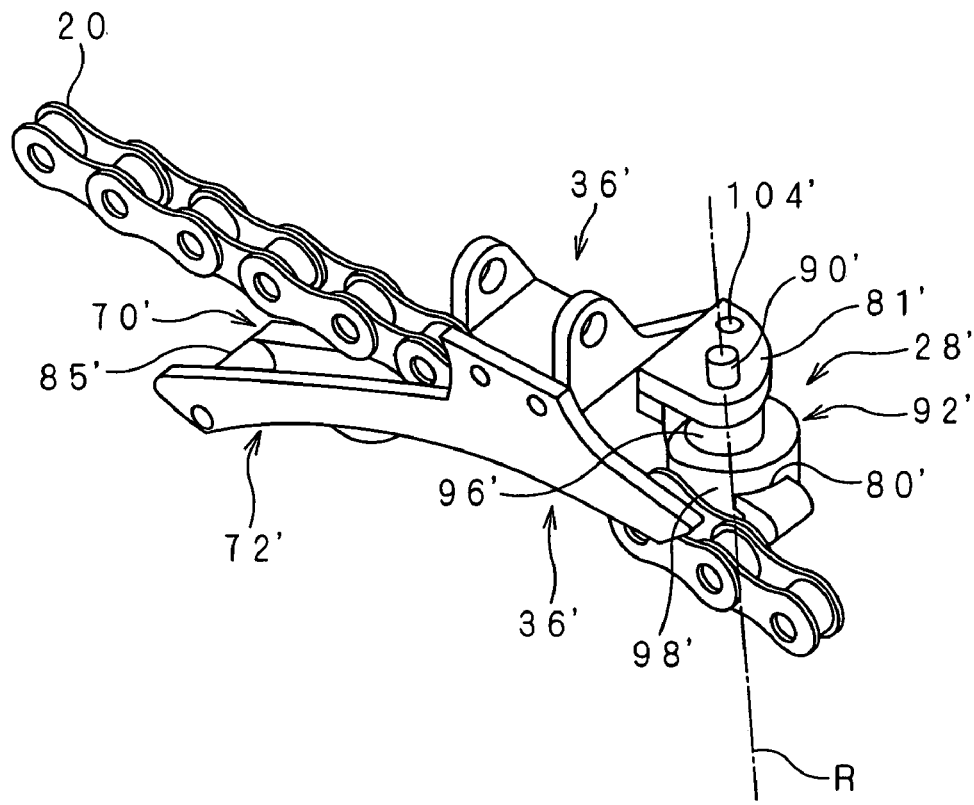
FIG. 30 is an upper, outside perspective view the inner guide member of the front derailleur illustrated in FIGS. 22-29 during a shifting operation of a chain from a smaller sprocket (not shown) to a larger sprocket (not shown)
Figure 31:
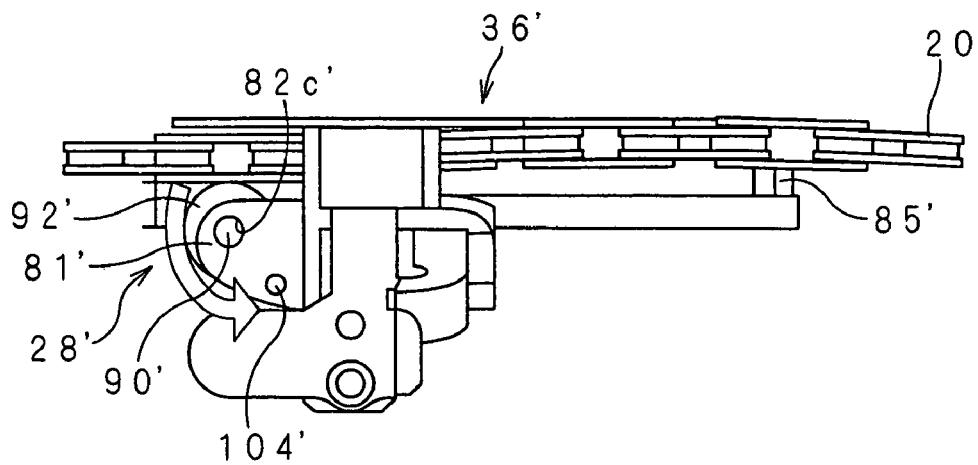
FIG. 31 is a partial, top plan view of the front derailleur illustrated in FIGS. 22-29 during a shifting operation of a chain from a smaller sprocket (not shown) to a larger sprocket (not shown)

The fixed track 90 basically includes a mounting plate 90a and a pair of support plates 90b and 90c that extend outwardly from the mounting plate to form a substantially U-shaped cross-sectional shape. Each support plate 90b and 90c has a longitudinal groove formed therein, as seen in FIGS. 15-18. The front and rear ends of the track 90 preferably have U-shaped retainer members 91a and 91b mounted therein, respectively. The retainer members 91a and 91b are preferably constructed of plastic, and are arranged and configured to limit movement of top and bottom bearing structures 93 that are mounted between the pushing element 92 and the support plates 90b and 90c. Specifically, each bearing structure 93 preferably includes a plurality of longitudinally arranged ball bearings (only two shown) that are retained in a plastic holder, as best seen in FIG. 18. The ball bearings are partially received in longitudinal grooves of both the pushing element 92 and the support plates 90b and 90c, as best seen in FIGS. 15-18.

The pushing element 92 basically includes a sliding part 96 and a chain contact part 98 that are fixedly attached to each other by a pair of screws 100. The sliding part 96 has longitudinal grooves formed therein that are opposed to the longitudinal grooves of the support plates 90b and 90c for receiving the bearing structures therebetween. Preferably the front and rear ends of the sliding part 96 have plastic pads coupled thereto, which selectively contact the front and rear stops 80a and 80b when the pushing element 92 moves to the end positions. The sliding part 96 is partially received within the track 90 to form a protrusion and recess arrangement.

Figure 7:
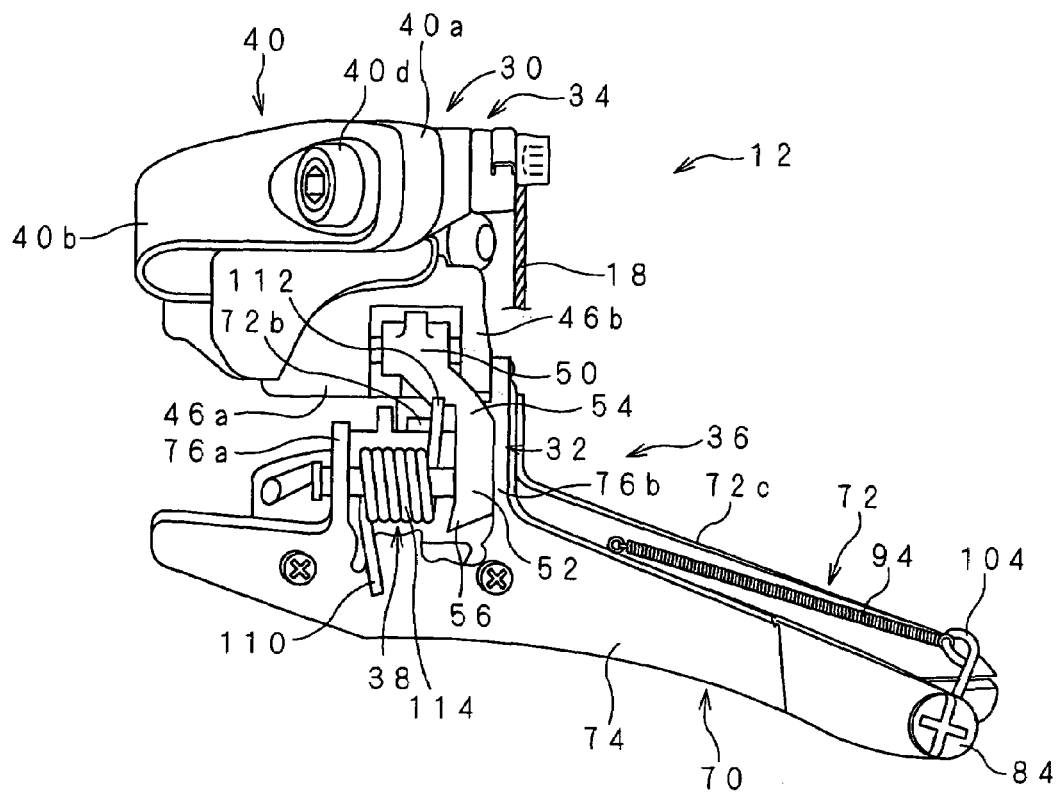
FIG. 7 is an inside elevational view of the front derailleur of the bicycle illustrated in FIG. 3, with the seat tube removed for the purpose of illustration.
Figure 8:
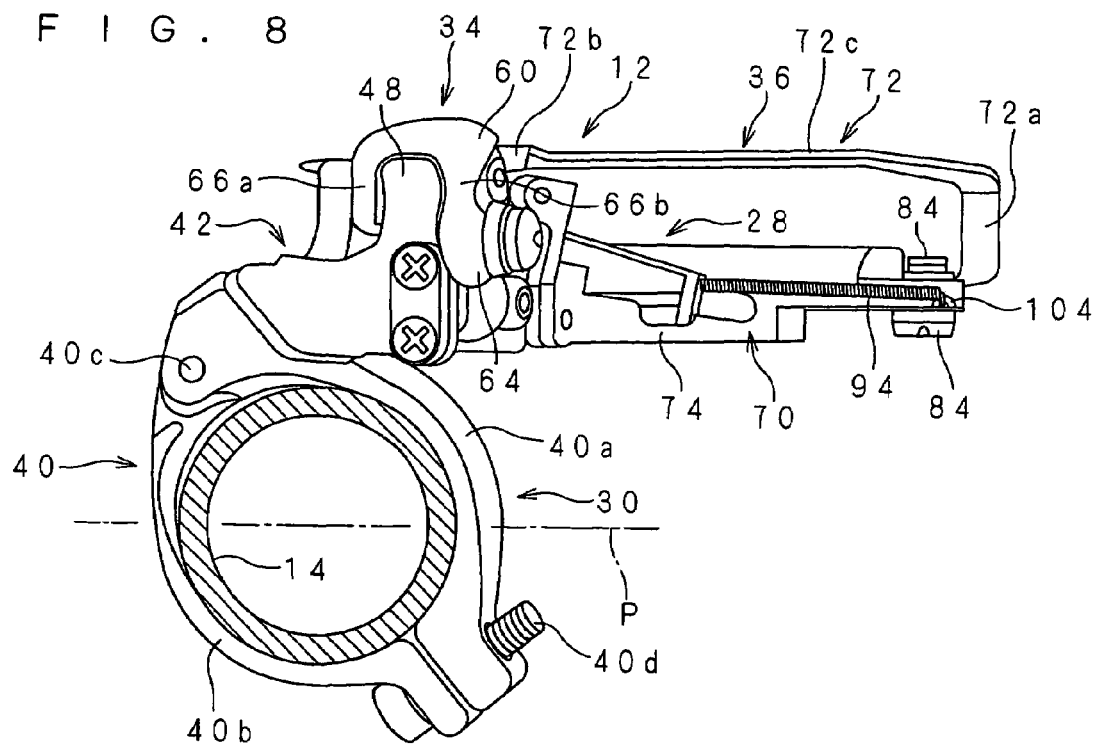
FIG. 8 is a top, plan view of the front derailleur of the bicycle illustrated in FIGS. 3 and 7, with the front derailleur coupled to the seat tube.
Figure 9:
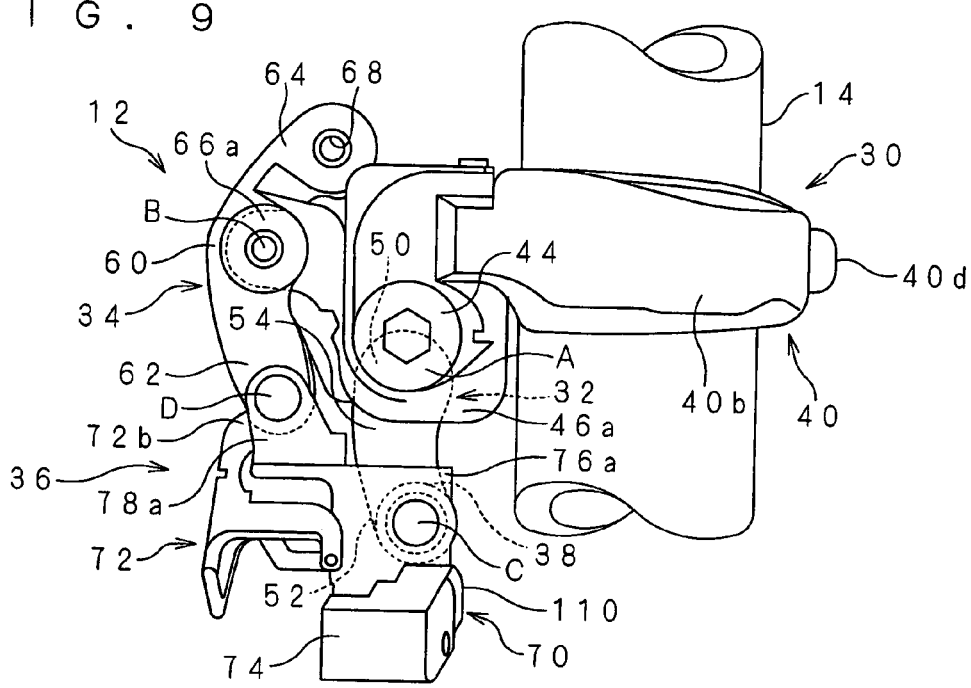
FIG. 9 is a front elevational view of the front derailleur of the bicycle illustrated in FIGS. 3, 7 and 8, with the front derailleur coupled to the seat tube.
Figure 10:
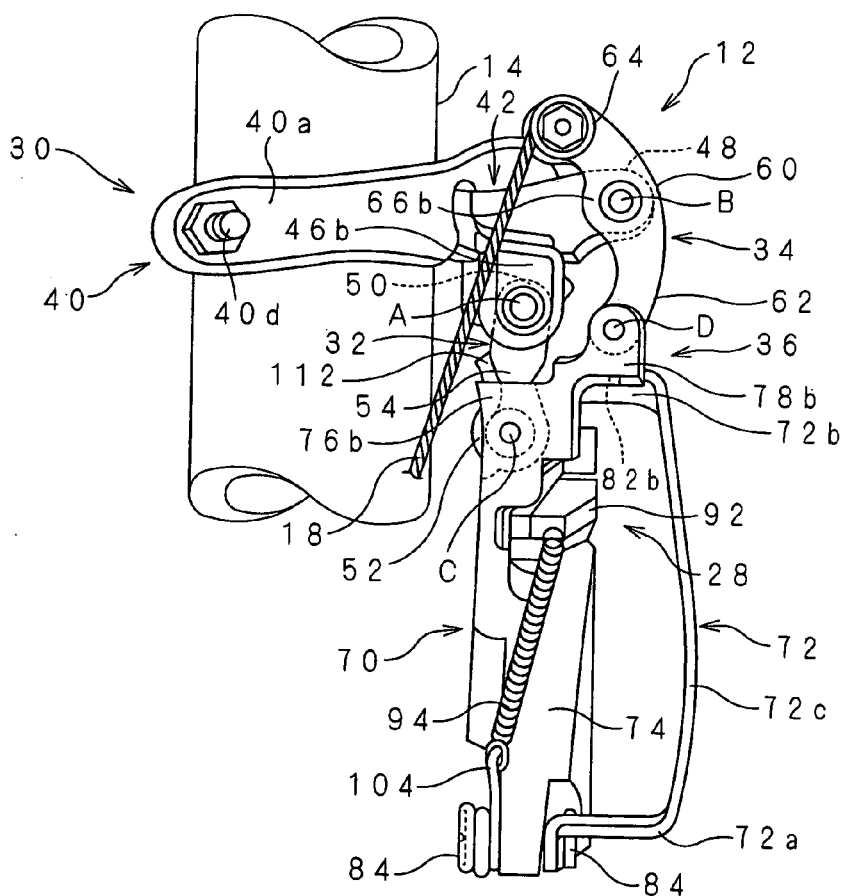
FIG. 10 is a rear elevational view of the front derailleur of the bicycle illustrated in FIGS. 3 and 7-9, with the front derailleur coupled to the seat tube.
Figure 11:
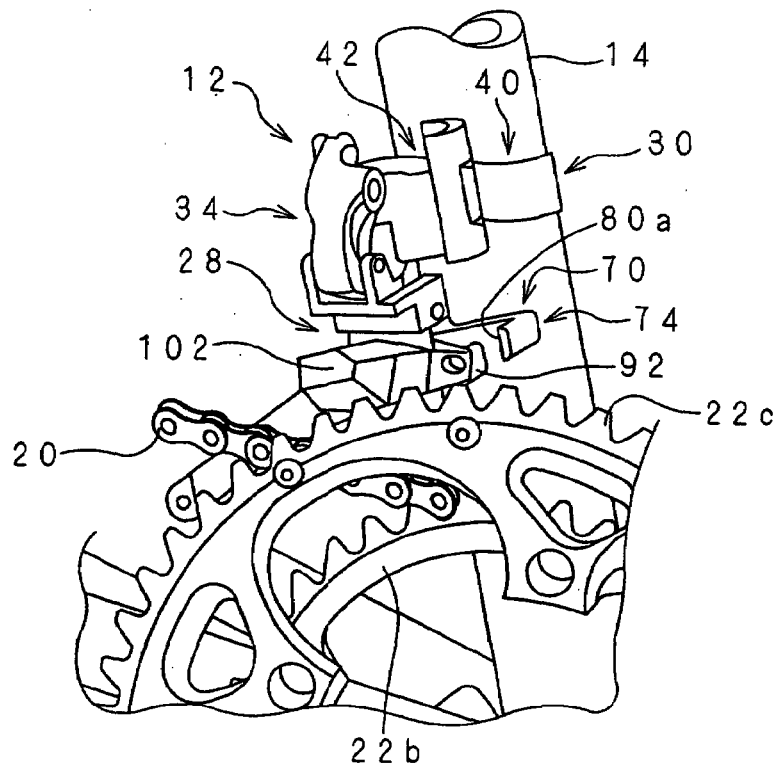
FIG. 11 is an upper, outside perspective view the front derailleur illustrated in FIGS. 3-10 prior to shifting a chain from a smaller sprocket to a larger sprocket (i.e., when the pushing element of the pushing mechanism is in an initial rest position or first position), with only two sprockets illustrated for the purpose of illustration.
Figure 12:
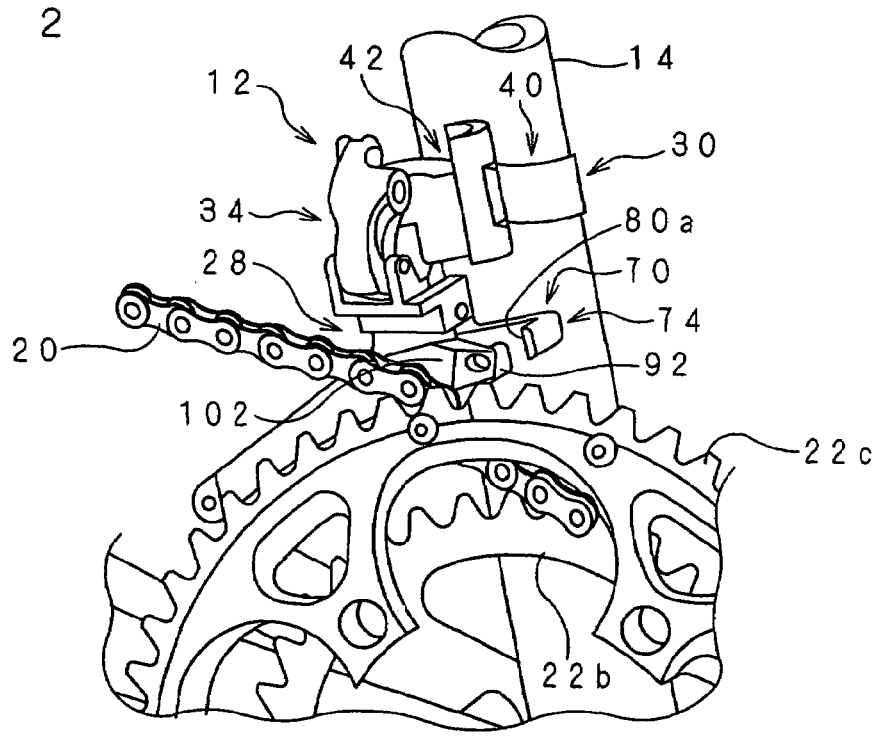
FIG. 12 is an upper, outside perspective view the front derailleur illustrated in FIGS. 3-10 during an early stage of a shifting operation of a chain from a smaller sprocket to a larger sprocket (i.e., when the chain engages the pushing element of the pushing mechanism, which longitudinally moves the pushing element such that the pushing element pushes the chain laterally outwardly), with only two sprockets illustrated for the purpose of illustration.
Figure 13:
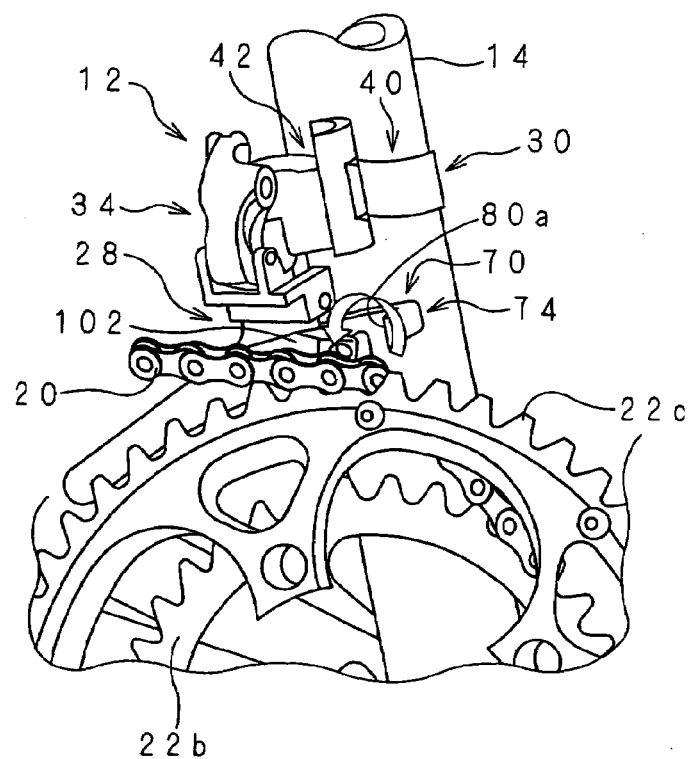
FIG. 13 is an upper, outside perspective view the front derailleur illustrated in FIGS. 3-10 during a later stage of a shifting operation of a chain from a smaller sprocket to a larger sprocket (i.e., when the chain still engages the pushing element of the pushing mechanism, which longitudinally moves the pushing element such that the pushing element pushes the chain laterally outwardly), with only two sprockets illustrated for the purpose of illustration.
Figure 14:
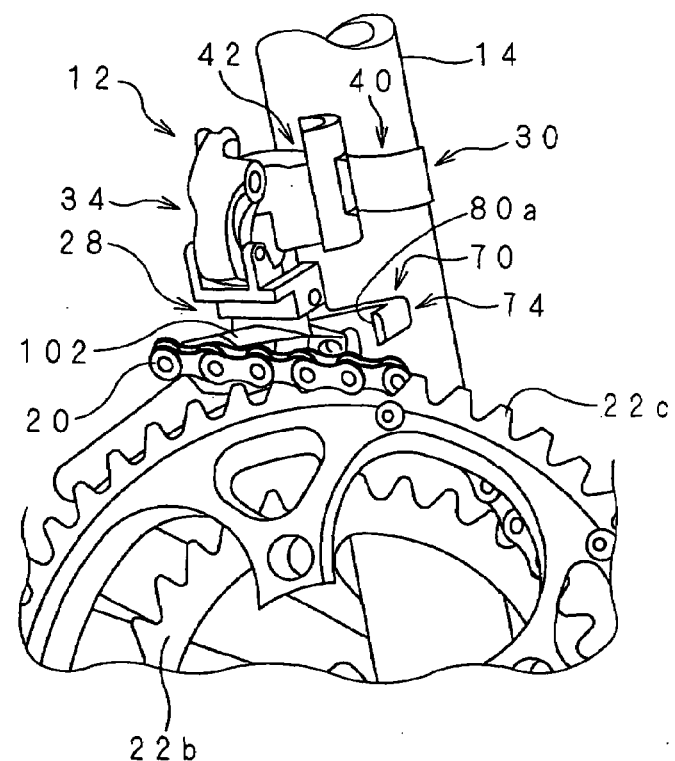
FIG. 14 is an upper, outside perspective view the front derailleur illustrated in FIGS. 3-10 during final stage of a shifting operation of a chain from a smaller sprocket to a larger sprocket (i.e., when the pushing element of the pushing mechanism is in a final moved position or second position after pushing the chain laterally onto the larger sprocket), with only two sprockets illustrated for the purpose of illustration.
Figure 17:
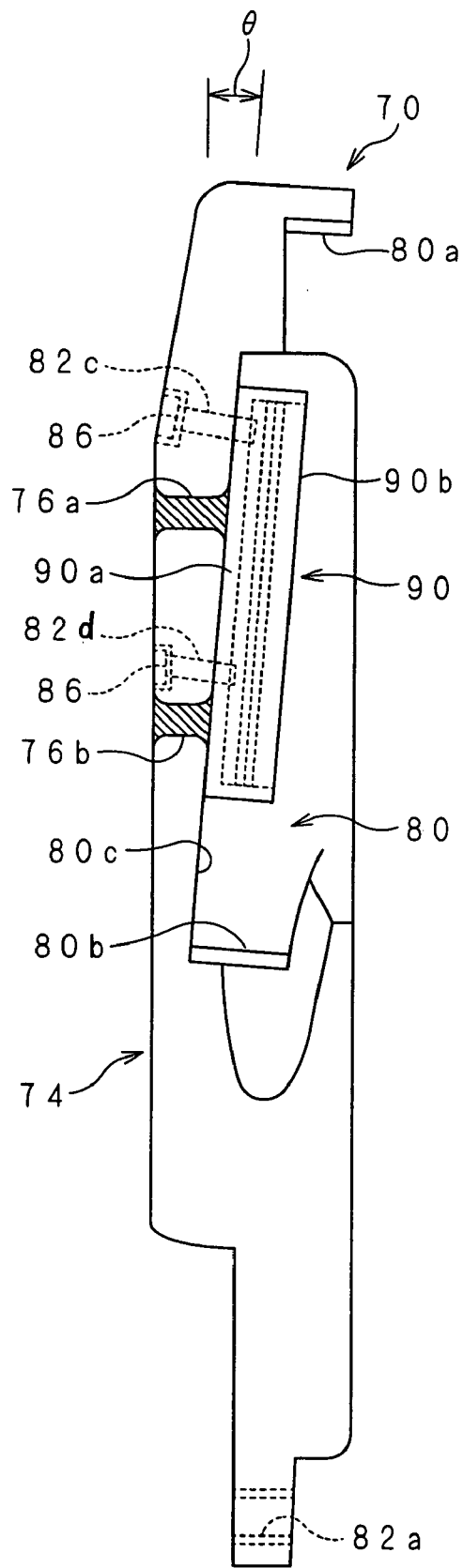
FIG. 17 is a further enlarged, top plan view of the inner guide member of the front derailleur illustrated in FIGS. 3 and 7-10, with portions broken away for the purpose of illustration of the pushing mechanism and with portions of the pushing mechanism removed for the purpose of illustration.

The chain contact part 98 includes a contoured chain contact surface 102 that includes a plurality of segmented sections. The chain contact surface 102 includes a main section S that is substantially parallel to the center plane P, while a plurality of other sections slope toward the center plane P from the main section S. Thus, the main section S is the laterally outermost section of the segmented contact surface 102. In any case, the chain contact surface 102 moves laterally outwardly and longitudinally forwardly as the pushing element 92 moves from the first position to the second position. The biasing member 94 (spring) is coupled within a hole in the rear end of the chain contact part 98. The biasing member 94 is also coupled to a hook 104, which is fixed to the inner chain guide plate element 74 via one of the fasteners (screws) 84, as seen in FIG. 7.

The outer guide member 72 is fixedly coupled to the inner guide member 70. Specifically, the rear of the chain guide member 72 is coupled to the rear of the inner chain guide plate element 74. The outer guide member 72 basically includes a rear mounting portion 72a, a front mounting portion 72b and an outer chain guide plate element 72c that is laterally spaced from the inner chain guide plate element 74. The outer chain guide plate element 72c and the inner chain guide plate element 74 with the pushing mechanism 28 form the chain guide portion 26 of the present invention with a chain receiving slot.

The biasing member 38 will now be discussed in more detail. The biasing member 38 is preferably a coil spring that is axially mounted on the pivot pin at the pivot axis C in front of the second coupling portion 52 of the inner link member 32, but rearwardly of the front attachment element 76a of the movable member 36. Thus, the biasing member 38 preferably includes a front end 110, a rear end 112 and a coiled portion 114 extending between the front and rear ends 110 and 112. The rear end 112 preferably extends radially outwardly from the coiled portion 114 and engages the transition portion 54 of the inner link member 32. On the other hand, the front end 110 preferably extends tangentially outwardly from the coiled portion 114 and engages the inner shift plate 74 of the movable member 36. The front end 110 is also supported by the rearward facing surface of the front attachment element 76a of the movable member 36. Thus, the front end 110 of the biasing member 38 is located in front of the upper coupling portion 50 of the inner link member 32.

Second Embodiment

Referring now to FIGS. 21-33, a bicycle 10' with a modified front derailleur 12' in accordance with a second embodiment will now be explained. The bicycle 10' is identical to the bicycle 10 of the first embodiment, except for the modified front derailleur 12'. Moreover, the front derailleur 12' is identical to the front derailleur 12 of the first embodiment, except the front derailleur 12' includes a modified inner link member 32', a modified movable member 36' with a modified pushing element 28' coupled thereto, and a modified biasing member 38'.

In view of the similarity between the first and second embodiments, the parts of the second embodiment that are identical to the parts of the first embodiment will be given the same reference numerals as the parts of the first embodiment. Moreover, in view of the similarity between the first and second embodiments, parts of this second embodiment that are functionally identical to parts of the first embodiment will be given the same reference numerals as the first embodiment but with a prime ("'"). Accordingly, the descriptions of the parts of the second embodiment that are identical to the parts of the first embodiment may be omitted for the sake of brevity, and the descriptions of the parts of the second embodiment that are functionally identical to the parts of the first embodiment may be reduced for the sake of brevity. However, it will be apparent to those skilled in the art from this disclosure that the descriptions and illustrations of the first embodiment also apply to this second embodiment, except as explained and illustrated herein.

The modified front derailleur 12' basically includes a base member 30, the inner link member 32', an outer link member 34, the movable member 36' with the pushing mechanism 28' and the biasing member 38'. The inner link member 32' is identical to the inner link member 32, except the inner link member 32' has a transition portion 54' that extends further rearwardly from an upper coupling portion 50' such that a lower coupling portion 52' is spaced further rearwardly than in the first embodiment. The lower coupling portion 52' preferably includes an abutment projection 56' that engages the modified biasing member 38' in this embodiment.

The biasing member 38' is identical to the biasing member 38 of the first embodiment, except the biasing member 38' includes modified front and rear ends 110' and 112'. The front end 110' extends tangentially from the lateral inside of a coiled portion 114' of the biasing member 38' rather than the lateral outside as in the first embodiment. The second end 112' extends radially downwardly from the coiled portion 114' rather than radially upwardly as in the first embodiment. The second end 112' engages the abutment projection 56' rather than the transition portion as in the first embodiment. The first end 110' engages the chain guide portion 26' in a manner similar to the first embodiment, except as explained and illustrated herein.

The modified movable member 36' basically includes an inner chain guide member 70', an outer chain guide member 72' and the pushing mechanism 28'. The inner and outer guide members 70' and 72' are fixedly, non-movably coupled together to form a chain receiving slot therebetween, while the pushing mechanism 28' is preferably movable attached to the inner chain guide member 70'.

In this embodiment, the pushing mechanism 28' is rotatably attached to the inner guide member 70' of the movable member 36' to move relative thereto. The inner guide member 70' basically includes an inner chain guide plate element 74', a pair of inner mounting flanges 76a' and 76b', a pair of outer mounting flanges 78a' and 78b' and a mounting recess 80' and a mounting plate 81' spaced upwardly from the mounting recess 80' to support the pushing mechanism 28'. The mounting recess 80' is simply a cutout formed in the inner chain guide plate element 74' for movably receiving the pushing mechanism 28' therein. The inner and outer guide members 70' and 72' are each preferably constructed by casting and/or machining a single piece of metallic material.

The inner chain guide plate element 74' further includes a rear attachment opening 82a', a pair of front attachment openings (not shown) and a pair of vertical attachment openings 82c' and 82d'. The rear attachment opening 82a' is preferably a horizontal threaded opening (i.e., threaded in a single direction) configured to receive a modified fastener 85'. Specifically, the fastener 85' is preferably an elongated screw/bolt with a roller/spacer mounted thereon to space the inner and outer guide members 70' and 72', which is used to fixedly attach the outer guide member 72' to the inner guide member 70'. The front attachment openings (not shown) are preferably horizontal threaded openings that receive threaded front fasteners 83' in order to fixedly couple the outer guide member 72' to the inner guide member 70'. The attachment openings 82c' and 82d' are formed in the mounting plate 81' and the inner chain guide plate element 74', respectively. The attachment openings 82c' and 82d' are used to couple part of the pushing mechanism 28' to the inner guide member 70', as also explained below.

In the illustrated embodiment, the pushing mechanism 28' basically includes a pivot pin 90', a movable chain pushing element 92' and a biasing element 94'. The pivot pin 90' is preferably fixed attached to the inner guide element 74' within the attachment openings 82c' and 82d' via a press fit or the like. The pushing element 92' is freely rotatably mounted on the pivot pin 90' to rotate about a rotation axis R. The biasing element 94' is preferably coupled between the pushing element 92' and the inner chain guide plate element 74'.

Figure 32:
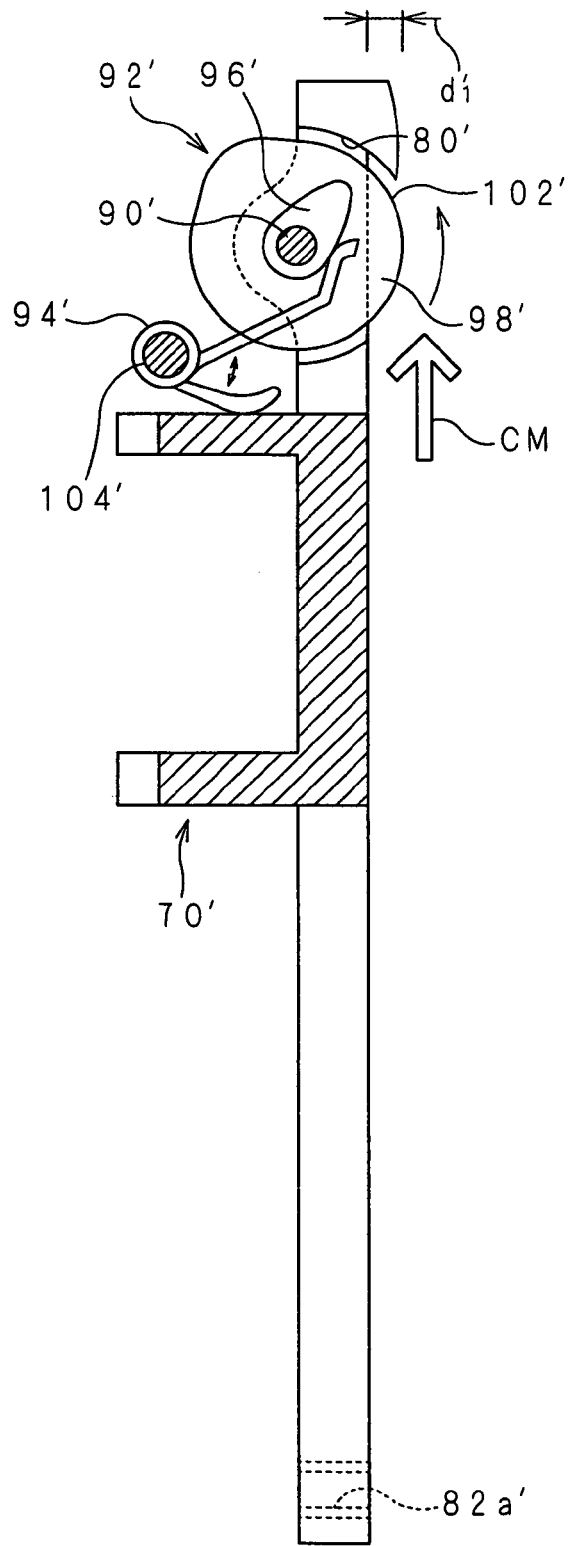
FIG. 32 is a further enlarged, top plan view of the inner guide member of the front derailleur illustrated in FIGS. 22 and 26-29, with portions broken away for the purpose of illustration of the pushing mechanism (with the pushing element of the pushing mechanism located in an initial rest or first position)
Figure 33:
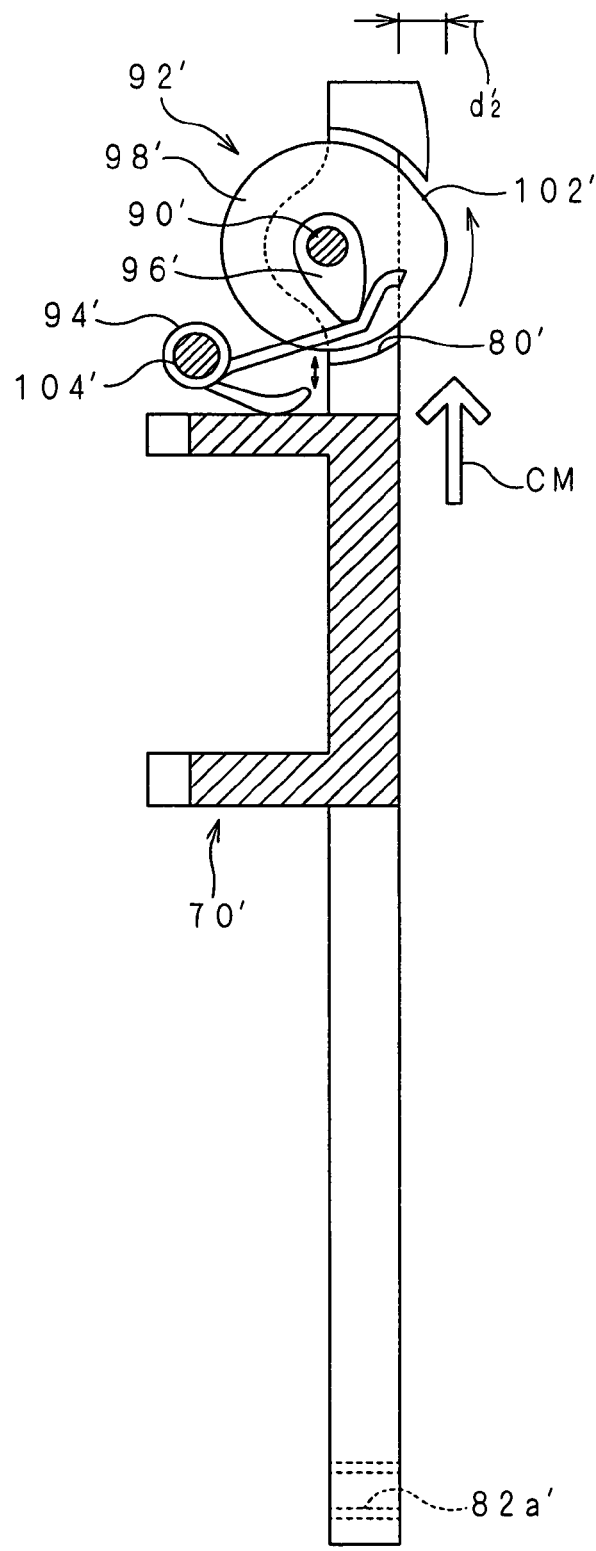
FIG. 33 is a further enlarged, top plan view of the inner guide member of the front derailleur illustrated in FIGS. 22 and 26-29, with portions broken away for the purpose of illustration of the pushing mechanism (with the pushing element of the pushing mechanism located in a final moved or second position).

More specifically, the pushing element 92' rotates relative to the pivot pin 90', and thus, relative to the inner chain guide plate element 74'. Due to the arrangement of the biasing element 94' and the pushing element 92', the pushing element 92' rotates from an initial (first) position where its outer most edge is spaced a distance $d_1$' of about 1.0 millimeter from the side surface of the inner chain guide plate element 74' as seen in FIG. 32 to a final moved (second) position in which its outer most edge is spaced a distance $d_2$' of about 3.0 millimeters from the side surface of the inner chain guide plate element 74' as seen in FIG. 33 during an up shift from a smaller sprocket to a larger sprocket. Then the pushing element 92' rotates in the same rotational direction back to the first position shown in FIG. 32 after the up shift. The biasing element 94' applies rotational resistance when the pushing element 92' is being rotated through the second position (FIG. 33) back to the first position (FIG. 32) such that the pushing element 92' is automatically returned to the first position after an up shift.

The pushing element 92' is chain activated. In other words, the pushing element 92' normally moves with the movable member 36' and does not move relative to the movable member 36', unless the chain 20 contacts the pushing element 92' during an up shift. When the moving chain 20 contacts the pushing element 92' during an up shift, the pushing element 92' then moves relative to the movable member 36' to push the chain laterally outwardly as the pushing element 92' rotates in the counter-clockwise direction as seen in FIGS. 32 and 33.

The pushing element 92' basically includes a movement control part 96' and a chain contact part 98' that are fixedly attached to each other. The movement control part 96' has a cam shaped outer control surface that engages the biasing element 94'. Preferably, the movement control part 96' and the chain contact part 98' are integrally formed together as a one-piece, unitary member of a lightweight, rigid material such as aluminum using conventional manufacturing techniques.

The chain contact part 98' includes a cam-shaped chain contact surface 102'. The chain contact surface 102' moves laterally outwardly and longitudinally forwardly as the pushing element 92' moves from the first position to the second position. More specifically, the part of the chain contact surface 102' that projects laterally out of the recess 80' moves longitudinally forwardly along a chain moving direction CM as it is rotated by the chain 20. Due to the cam shape of the pushing element 92', the chain contact surface 102' moves laterally outwardly as the pushing element 92' moves from the first position to the second position (i.e., in the area that contacts the chain 20. The biasing member 94' (spring) is coupled on a bolt 104' that is fixed in a hole of the mounting plate 81'. The one end of the biasing member 94' engages the inner chain guide plate element 74' while the other end engages the cam shaped outer surface of the control part 96'.

The outer guide member 72' is fixedly coupled to the inner guide member 70'. Specifically, the rear of the outer guide member 72' is coupled to the rear of the inner chain guide plate element 74'. The outer guide member 72' basically includes a rear mounting portion 72a', a front mounting portion 72b' and an outer chain guide plate element 72c' that is laterally spaced from the inner chain guide plate element 74'. The outer chain guide plate element 72c' and the inner chain guide plate element 74' with the pushing mechanism 28' form the chain guide portion 26' of the present invention with a chain receiving slot.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle front derailleur comprising: a base member configured to be fixedly coupled to a bicycle frame; a movable member having a chain guide portion; and a linkage assembly coupled between the base member and the movable member to move the chain guide portion between a retracted position and an extended position, the chain guide portion including an inner chain guide member, an outer chain guide member non-movably coupled to the inner chain guide member and a pushing element with a contact surface, the outer chain guide member being spaced laterally outwardly from the inner chain guide member to form a longitudinally extending chain receiving slot between opposing inner and outer laterally facing surfaces of the inner and outer chain guide members, the pushing element being movably coupled to the inner chain guide member and activated by a chain to move relative to the inner chain guide member from a first position with the pushing element at rest to a second position, with the contact surface moving both longitudinally and laterally outwardly into the chain receiving slot toward the outer chain guide member as the pushing element moves from the first position to the second position.

2. A bicycle front derailleur comprising: a base member configured to be fixedly coupled to a bicycle frame; a movable member having a chain guide portion; and a linkage assembly coupled between the base member and the movable member to move the chain guide portion between a retracted position and an extended position, the chain guide portion including an inner chain guide member, an outer chain guide member non-movably coupled to the inner chain guide member and a pushing element supported by the chain guide portion with a contact surface, the outer chain guide member being spaced laterally from the inner chain guide member to form a longitudinal chain receiving slot extending along a longitudinal derailleur plane between the opposing inner and outer laterally facing surfaces of the inner and outer chain guide members, the pushing element being arranged to move relative to the inner chain guide member from a first position to a second position such that the contact surface moves both laterally towards the outer chain guide member and longitudinally relative to the derailleur plane as the pushing element moves from the first position to the second position, the pushing element being normally biased toward the first position from the second position by a biasing element such that the contact surface is normally urged laterally away from the outer chain guide member.

3. The bicycle front derailleur according to claim 1, wherein the pushing element is coupled in a non-cable operated arrangement.

4. The bicycle front derailleur according to claim 1, wherein
the pushing element is not attached to the base member and is not attached to the linkage assembly such that the pushing element moves independently of movement of the linkage assembly.

5. A bicycle front derailleur comprising:
a base member configured to be fixedly coupled to a bicycle frame;
a movable member having a chain guide portion; and
a linkage assembly coupled between the base member and the movable member to move the chain guide portion between a retracted position and an extended position, the chain guide portion including a chain guide member and a pushing element with a contact surface, the pushing element being arranged to move relative to the chain guide member from a first position to a second position such that the contact surface moves both laterally outwardly and longitudinally as the pushing element moves from the first position to the second position,
the pushing element being slidably attached to the movable member.

6. The bicycle front derailleur according to claim 5, wherein
the pushing element is slidable in a substantially longitudinal direction relative to a center plane of the bicycle frame.

7. The bicycle front derailleur according to claim 6, wherein
the pushing element is slidable along a predetermined path between a rear stop element and a front stop element.

8. The bicycle front derailleur according to claim 7, wherein
the predetermined path is slightly tapered relative to the center plane of the bicycle frame such that the predetermined path has a forward end and a rearward end arranged closer to the center plane of the bicycle frame than the forward end.

9. The bicycle front derailleur according to claim 8, wherein
the first position is located rearwardly of the second position along the predetermined path.

10. The bicycle front derailleur according to claim 9, wherein
the pushing element is normally biased toward the first position from the second position by a biasing element.

11. The bicycle front derailleur according to claim 5, wherein
the pushing element is a slidably attached to the movable member by a protrusion and recess arrangement.

12. The bicycle front derailleur according to claim 5, wherein
the pushing element is normally biased toward the first position from the second position by a biasing element.

13. The bicycle front derailleur according to claim 5, wherein
the pushing element is movably attached to the chain guide member of the movable member.

14. The bicycle front derailleur according to claim 5, wherein
the contact surface is a contoured surface that includes a plurality of segmented sections.

15. The bicycle front derailleur according to claim 1, wherein
the pushing element is normally biased toward the first position from the second position by a biasing element.

16. The bicycle front derailleur according to claim 1, wherein
the contact surface of the pushing element is laterally spaced toward the outer laterally facing surface from the inner laterally facing surface when the pushing element is in the first position.

17. The bicycle front derailleur according to claim 1, wherein
the inner laterally facing surface of the inner chain guide member has a forward most edge and a rearward most, and the entire contact surface is longitudinally disposed between the forward most edge and the rearward most edge of the inner laterally facing surface.

18. The bicycle front derailleur according to claim 2, wherein
the pushing element is movably attached to the chain guide member.

19. The bicycle front derailleur according to claim 2, wherein
the pushing element is coupled in a non-cable operated arrangement.

20. The bicycle front derailleur according to claim 2, wherein
the pushing element is not attached to the base member and is not attached to the linkage assembly such that the pushing element moves independently of movement of the linkage assembly.

21. The bicycle front derailleur according to claim 2, wherein
the pushing element is movably attached to the inner chain guide member of the movable member such that the contact surface moves toward the outer chain guide member as the pushing element moves from the first position to the second position.

22. The bicycle front derailleur according to claim 2, wherein
the contact surface of the pushing element is laterally spaced toward the outer laterally facing surface from the inner laterally facing surface when the pushing element is in the first position.

23. The bicycle front derailleur according to claim 2, wherein
the inner laterally facing surface of the inner chain guide member has a forward most edge and a rearward most, and the entire contact surface is longitudinally disposed between the forward most edge and the rearward most edge of the inner laterally facing surface.

24. The bicycle front derailleur according to claim 5, wherein
the pushing element is coupled in a non-cable operated arrangement.

25. The bicycle front derailleur according to claim 5, wherein
the pushing element is not attached to the base member and is not attached to the linkage assembly such that the pushing element moves independently of movement of the linkage assembly.

26. The bicycle front derailleur according to claim 5, wherein
the contact surface of the pushing element is laterally spaced toward the outer laterally facing surface from the inner laterally facing surface when the pushing element is in the first position.

27. The bicycle front derailleur according to claim 5, wherein
the inner laterally facing surface of the inner chain guide member has a forward most edge and a rearward most, and the entire contact surface is longitudinally disposed between the forward most edge and the rearward most edge of the inner laterally facing surface.

* * * * *